United States Patent

Takada et al.

[11] Patent Number: 5,542,888
[45] Date of Patent: Aug. 6, 1996

[54] AUTOMATIC TRANSMISSION CONTROL SYSTEM WITH VARIABLE PRESSURE DISCHARGE

[75] Inventors: Hiroshi Takada; Hiroshi Funatsu, both of Hiroshima, Japan

[73] Assignee: Mazda Motor Corporation, Hiroshima-ken, Japan

[21] Appl. No.: 251,859

[22] Filed: May 31, 1994

[30] Foreign Application Priority Data

May 31, 1993 [JP] Japan .................................... 5-154167

[51] Int. Cl.⁶ .................................................. F16H 61/26
[52] U.S. Cl. .......................... 475/134; 475/129; 477/130; 477/150; 477/158
[58] Field of Search ............................... 477/71, 72, 117, 477/130, 150, 158; 475/127, 128, 129, 134

[56] References Cited

U.S. PATENT DOCUMENTS

| | | |
|---|---|---|
| 4,422,536 | 12/1983 | Shatuck .................................... 475/134 |
| 5,176,046 | 1/1993 | Fujiwara et al. ......................... 475/129 |
| 5,246,407 | 9/1993 | Paulsen et al. .......................... 475/129 |

FOREIGN PATENT DOCUMENTS 1-156324   10/1989   Japan .
4-248064   8/1992    Japan .

*Primary Examiner*—Rodney H. Bonck
*Assistant Examiner*—Sherry Estremsky
*Attorney, Agent, or Firm*—Keck, Mahin & Cate

[57] ABSTRACT

An automatic transmission control system has first and second hydraulic circuits leading to a low/reverse brake and a reverse clutch, respectively, which perform supplying and discharging of hydraulic pressure to the low/reverse brake and reverse clutch, respectively, so as to lock and unlock them. The first circuit is provided, from the upstream end, with an orifice for restraining hydraulic pressure, an accumulator disposed downstream from the orifice for pressure accumulation, and a switching valve for switching supply and discharge of the hydraulic pressure. The second hydraulic circuit is provided, from the upstream end, with a switching valve for switching communication of the first hydraulic circuit between the orifice and switching valve with the second hydraulic circuit and communication of the first hydraulic circuit upstream from the orifice with the second hydraulic circuit.

16 Claims, 19 Drawing Sheets

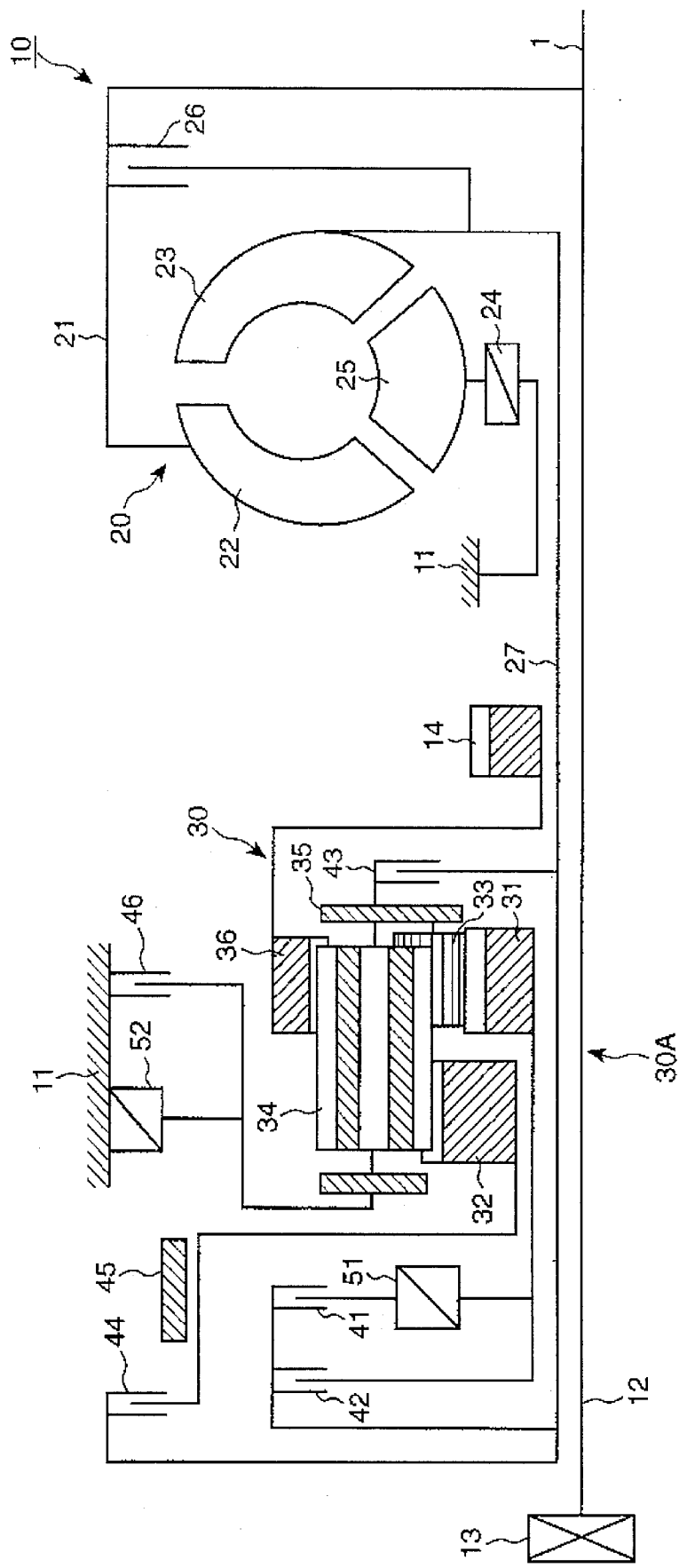

JOINS FIG. 2B

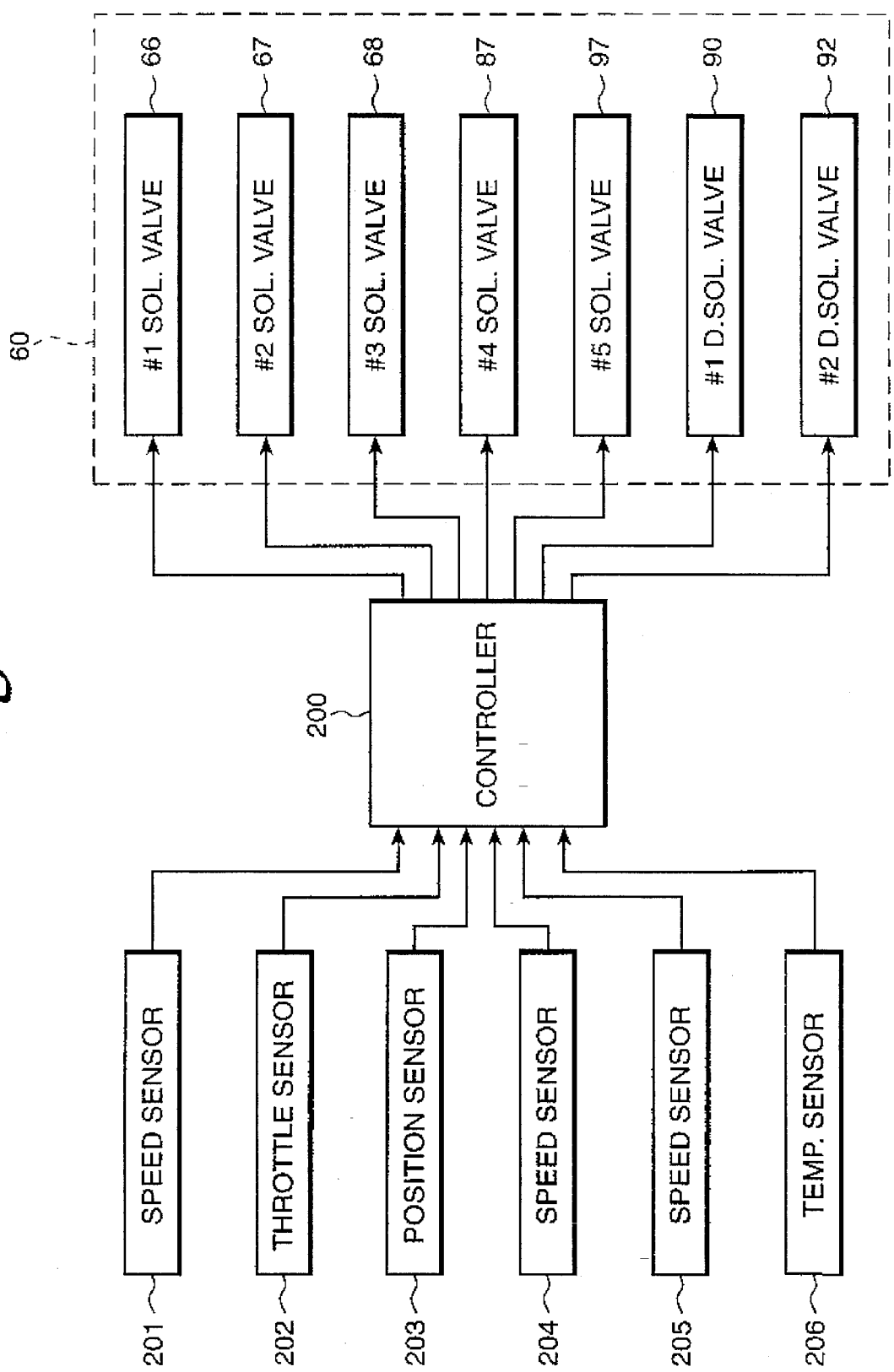

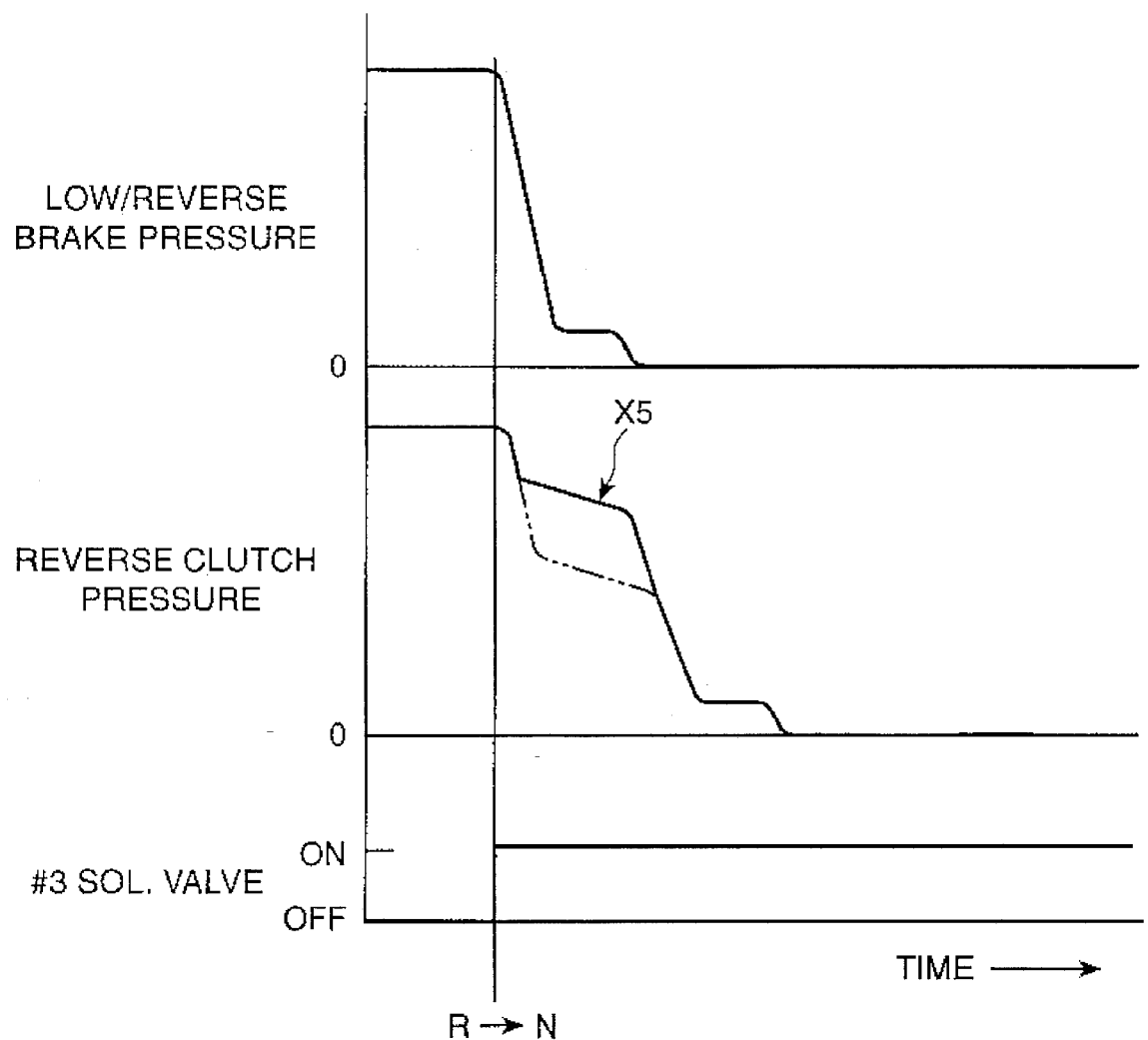

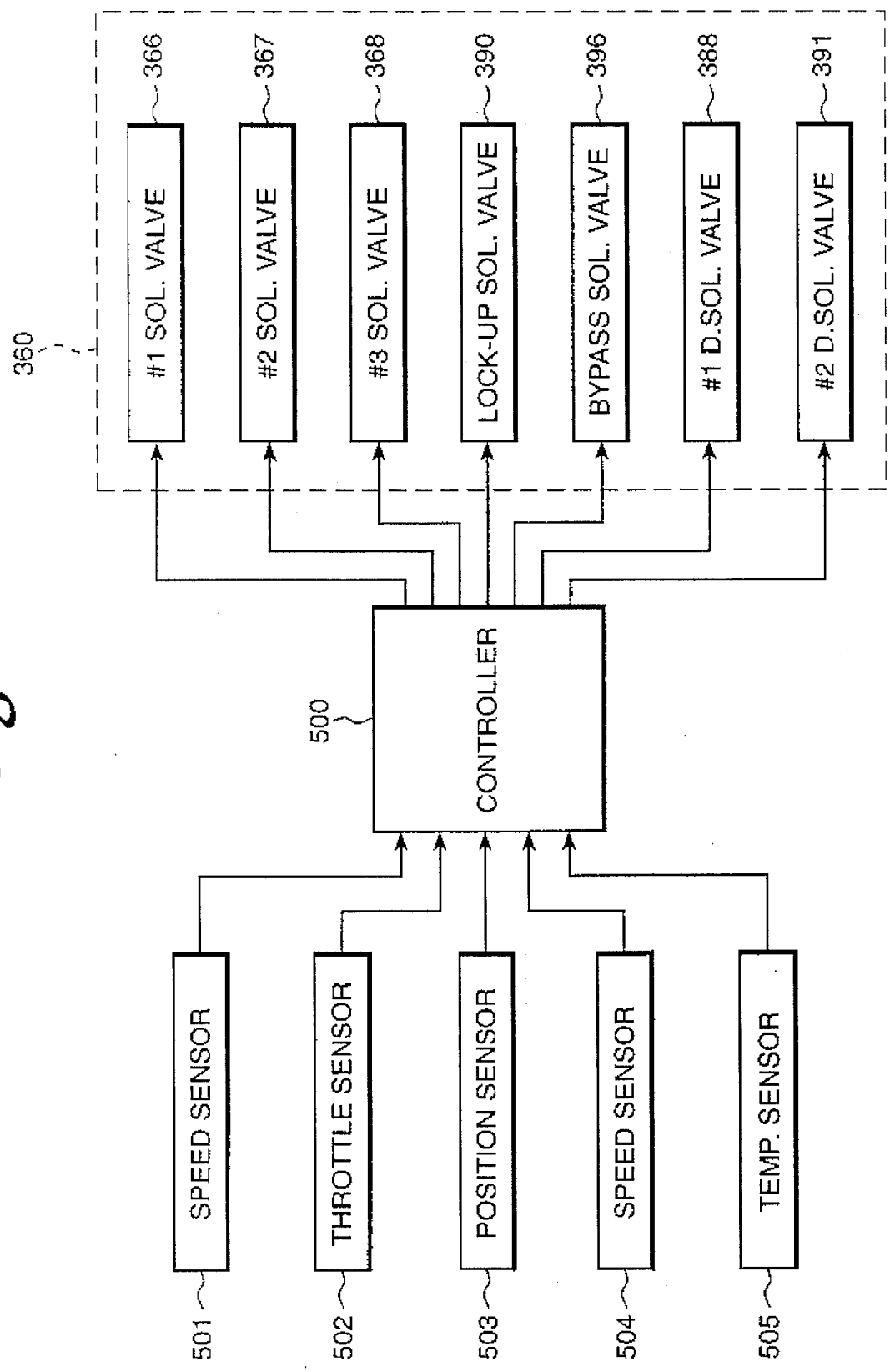

AUTOMATIC TRANSMISSION CONTROL SYSTEM WITH VARIABLE PRESSURE DISCHARGE

BACKGROUND OF THE INVENTION

1. Field of the Invention

The present invention relates to a control system for an automobile automatic transmission, and, more particularly, to an automatic transmission control system whose hydraulic circuit has an accumulator for activating a frictional coupling element in a reverse range of an automatic transmission.

2. Description of Related Art

Typically, automatic transmissions for automobiles have a torque converter and a transmission mechanism which includes a plurality of frictional coupling elements selectively coupled and uncoupled to place the automatic transmission into any one of desired transmission modes and gear ranges according to driving conditions. Selectively coupling and uncoupling of these frictional coupling elements is performed by the use of hydraulically operated actuators. When shifting such an automatic transmission into a reverse (R) range from a neutral (N) range, a reverse gear is provided by locking a specific one of the frictional coupling elements, which has been unlocked or released in the neutral (N).

The automatic transmission transmits the engine output torque multiplied at a large ratio corresponding to a reduction ratio of the reverse gear to wheels when locking the specific frictional element to enable reverse gear during a shift from the neutral range to the reverse range (which is hereafter referred to as an N-R shift), which can produce shift shocks which are so-called N-R shift shocks and give a driver an uncomfortable feeling of gear shift during an N-R shift.

In order for the automatic transmission to eliminate such an N-R shift shock, it is typical to provide an accumulator in a hydraulic circuit for generating hydraulic pressure changing in level by way of what is called "shelf pressure" and activating or locking the specific frictional coupling element with the shelf pressure. The term "shelf pressure" as used in this specification shall mean and refer to transitional pressure increasingly or decreasingly changing at an incline or gradient more gentle or sluggish before and after the change.

In some automatic transmissions of this type, due to structural or mechanical considerations, the transmission gear mechanism necessarily includes two frictional coupling elements which are simultaneously locked to provide a reverse gear. Such an automatic transmission produces considerably heavy shift shocks during an N-R shift when the two frictional coupling elements are locked. In an attempt to reduce N-R shift shocks, these two frictional coupling elements are designed and adapted to be locked with a time delay relative to each other by means of the operation of an accumulator provided in a hydraulic circuit of either one of them. An important factor in the designing of the automatic transmission control system is the selection of which of these frictional coupling elements shall have its hydraulic circuit so controlled regarding the accumulator.

This is because some frictional coupling elements, such as clutches and brakes, cooperate with hydraulic circuits relating thereto which are provided with what is called drift-on-balls for canceling centrifugal hydraulic force exerting on the frictional coupling elements which are generally different in operational characteristics from one another. Because operation and fabrication of drift-on-balls is well known to those skilled in the art of hydraulic control, only a brief description will be hereafter given. In a hydraulic control system a frictional coupling element is fixedly mounted for rotation on and placed remote from a rotary shaft. Hydraulic pressure or working oil is introduced into an axially extending passage in the rotary shaft and then into a radial passage so as to be supplied to the frictional coupling element. During rotation of the shaft, the working oil remaining in the passage tends to act on the frictional coupling element due to centrifugal force. With an increase in centrifugal force, the frictional coupling element is adversely affected by the working oil. However, the drift-on-ball installed in the passage moves axially with an increase in centrifugal force and shuts down the communication of the passage with the frictional coupling element. In addition, some clutches and brakes have diaphragm springs used as return springs which are generally different in operational characteristics from one another. For these reasons, when the accumulator is provided in connection with one of the frictional coupling elements which and/or whose hydraulic circuit have differences in operational characteristics from the remaining frictional coupling elements, the accumulator must generate hydraulic pressure including shelf pressure with a large incline or gradient so as to absorb or cancel its peculiar characteristic operational differences. However, this is unfavorable for the demands of avoidance of shift shocks.

Accordingly, in the automatic transmission having two specific frictional coupling elements, such as a reverse clutch and a low/reverse brake, which are simultaneously locked to provide a reverse gear, the accumulator is preferably provided in a hydraulic circuit in connection with the low/reverse brake which has operational characteristics less different from other low/reverse brakes. With the provision of the accumulator in a hydraulic circuit in connection with the low/reverse brake, the automatic transmission performs locking of the low/reverse brake with a time delay from locking of the reverse clutch during a gear shift to the reverse gear, so as to reduce effectively N-R shift shocks. On the other hand, the automatic transmission encounters shift shocks during an R-N shift resulting from performance of unlocking of the low/reverse brake with a time delay from unlocking of the reverse clutch. This shift shock is caused due to an abrupt torque change during the unlocking of the reverse clutch and gives a driver an uncomfortable feeling of gear shift.

In an attempt to reduce shift shocks generated in the automatic transmission of this type when both reverse clutch and low/reverse brake are locked to provide a reverse gear, it is desirable to provide an accumulator and a shift valve in a low/reverse brake activating circuit in order from the upstream side, but the downstream side of a reverse clutch activating circuit, so that the shift valve changes the communication of a pressure line from the low-reverse brake to a drain line upon a shift of the automatic transmission from the reverse (R) range to any possible ranges other than the reverse (R) ranges. Such an automatic transmission control system is known from, for instance, Japanese Unexamined Patent Publication No. 4-248,064.

With the automatic transmission described in the above publication, since the accumulator causes the low/reverse brake to be locked with a time delay from locking of the reverse clutch during an N-R shift, N-R shift shocks are considerably reduced. Conversely, during an R-N shift, while the shift valve changes the communication of the pressure line from the low/reverse brake to the drain line, the accumulator, disposed upstream from the shift valve in the hydraulic circuit relating to the reverse clutch, is brought into communication with the hydraulic circuit relating to the reverse clutch and unlocking of the reverse clutch is caused with a time delay from unlocking of the low/reverse brake. As a result, shift shocks are effectively reduced.

However, the automatic transmission control system described in the above publication encounters inter-lock of the transmission gear mechanism which possibly causes an engine stall or engine stop. For example, during a shift from the reverse (R) range to the drive (D) range (which is hereafter referred to as a R-D shift) in which both low/reverse brake and reverse clutch are unlocked, because the accumulator is brought into communication with the hydraulic circuit for activating the reverse clutch, unlocking activation of the reverse clutch is caused with a delay. On the other hand, when the automatic transmission is in the drive (D) range, locking of a forward clutch, which is one of the frictional coupling elements activated to provide forward gears, starts when line pressure is supplied. In this instance, when locking of the forward clutch is accomplished prior to the completion of unlocking of the reverse clutch, the transmission gear mechanism falls into an inter-lock, keeping the frictional coupling elements slipping for a long time. This causes a deterioration in the durability of the frictional coupling elements and, if the worst happens, causes an engine stop or engine stall. It may be of course effective to install a diaphragm and an accumulator in the hydraulic circuit for the forward clutch so as to provide a delay of locking of the forward clutch. However, since, when taking the responsiveness of the forward clutch during an N-D shift into account, there is marginal time in the delay of locking, there still remains the problem of engine stalls.

The same problem possibly occurs during a shift from the drive (D) range to the reverse (R) range (which is hereafter referred to as a D-R shift). Specifically, in the event of locking of the reverse clutch accomplished prior to the completion of unlocking of the forward clutch, the transmission gear mechanism falls into an inter-lock, resulting in an engine stop or engine stall.

SUMMARY OF THE INVENTION

It is an object of the present invention to provide a control system, for an automatic transmission having a plurality of frictional coupling elements which are selectively locked and unlocked to place the automatic transmission into any desired one of a plurality of gear ranges, which can perform shifts to a neutral (N) range without shift shocks and shifts from and to a reverse (R) range without an inter-lock of the transmission gear mechanism.

The above object of the present invention is achieved by providing a control system for an automatic transmission provided with a plurality of hydraulically controlled frictional coupling elements which are selectively locked and unlocked so as to place the automatic transmission into any one of a plurality of desired gear ranges. The automatic transmission is manually shifted into a plurality of ranges including a reverse range, a neutral range and forward range such as a drive range, a low-speed range and a second-speed range. A specific frictional element is unlocked by discharging of hydraulic pressure during a shift relating to the reverse range to or from the forward range. The discharge rate of hydraulic pressure from the specific frictional element is varied larger for the shift from and to the reverse range than for a shift to the neutral range from the reverse range and the forward range.

Specifically, the automatic transmission control system has a manually operated range shift means to select any one of the shiftable ranges and when it selects the reverse range, both reverse clutch and low/reverse brake, which are of the frictional coupling element type, are locked. The control system includes first and second hydraulic circuits disposed downstream from the manually operated range shift means and leading to the reverse brake and the reverse clutch, respectively. The first hydraulic circuit supplies hydraulic pressure to the reverse brake to lock it and discharges the hydraulic pressure from the reverse brake to unlock it. Similarly, the second hydraulic circuit supplies hydraulic pressure to the reverse clutch to lock it and discharges the hydraulic pressure from the reverse clutch to unlock it. In the first hydraulic circuit there are provided from the upstream thereof a hydraulic pressure restraining means for restraining hydraulic pressure, a hydraulic pressure accumulation means for accumulation of hydraulic pressure, a switching valve for switching the supply of the hydraulic pressure and the discharge of the hydraulic pressure. On the other hand, the second hydraulic circuit is provided with a switching means for switching hydraulic communication of the first hydraulic circuit between the hydraulic pressure restraining means and the switching valve with the second hydraulic circuit and hydraulic communication of the first hydraulic circuit upstream from the hydraulic pressure restraining means with the second hydraulic circuit.

The control system further includes a hydraulic pressure line provided in parallel with the switching means in the first hydraulic circuit and a check valve disposed in the hydraulic pressure line for restraining hydraulic pressure discharged from the reverse clutch. The switching means switches hydraulic communication of the hydraulic pressure line upstream from the check valve with the first hydraulic circuit between the hydraulic pressure restraining means and the switching valve and hydraulic communication of the hydraulic pressure line upstream and downstream from the check valve.

The hydraulic pressure accumulation means includes an accumulator whose back pressure is regulated such that the accumulator provides locking shelf pressure in the hydraulic pressure for locking of the reverse brake during a neutral-to-reverse shift and unlocking shelf pressure in the hydraulic pressure for unlocking of the reverse clutch during a reverse-to-neutral shift.

The first hydraulic circuit may include a first one-way orifice for restraining supply of hydraulic pressure to the reverse brake and a hydraulic pressure accumulator disposed downstream from the first one-way orifice for accumulation of hydraulic pressure, and the second hydraulic circuit may include a second one-way orifice for restraining discharge of hydraulic pressure from the reverse clutch and a bypass valve for connecting and disconnecting hydraulic communication of a bypass hydraulic pressure line which allows hydraulic pressure to bypass the first hydraulic circuit between the first one-way orifice and the hydraulic pressure accumulator and the second hydraulic circuit downstream from the second one-way orifice. The automatic transmission control system may further include a switching valve having a drain port in the first hydraulic circuit downstream from the hydraulic pressure accumulator to discharge hydraulic pressure from the reverse brake. The bypass valve is caused to provide the hydraulic communication of the bypass hydraulic pressure line upon a lapse of a predetermined time, which may be defined as a time from a shift made from the reverse range to the neutral range to when a predetermined rotational speed of turbine is attained, after a shift from the reverse range to the neutral range, and the switching valve is caused to bring the first hydraulic circuit downstream from the switching valve into communication with the drain port. In this instance, at least either one of the bypass valve and the switching valve may be one of shift valves used to cause the frictional coupling elements to be locked and unlocked so as to provide the desired gears.

With the automatic transmission control system of the present invention, because the hydraulic pressure is discharged quickly from the frictional coupling elements, i.e. the reverse clutch and reverse brake or low/reverse brake, during, for instance, a shift from the reverse range to the drive range and vice versa, these elements are prevented from encountering a so-called inter-lock. On the other hand, because, during a shift to the neutral range from the reverse range or the drive range, the discharge of hydraulic pressure from the frictional coupling elements is made slow within the limits in which the control system encounters a deterioration in responsiveness, the automatic transmission causes less shift shocks during the reverse-to-neutral shift.

During a shift from the neutral range to the reverse range, the hydraulic communication is made between the first hydraulic circuit upstream from the hydraulic pressure restraining means and the second hydraulic circuit, the low/reverse brake is locked after locking of the reverse clutch. The difference in timing between locking of these clutch and brake prevents the automatic transmission from causing shift shocks during the neutral-to-reverse shift. On the other hand, during a shift from the reverse range to the neutral range, the hydraulic communication is changed to between the first hydraulic circuit downstream from the hydraulic pressure restraining means and the second hydraulic circuit, and the hydraulic communication is disconnected between the first hydraulic circuit downstream the hydraulic pressure restraining means and the hydraulic pressure accumulation means, so as to bring the reverse clutch into communication with the hydraulic pressure accumulation means. This results in early unlocking of the low/reverse brake and a considerable decrease in shift shock. Further, during a shift from the reverse range to the drive range, the second hydraulic circuit is brought into communication with the first hydraulic circuit upstream from the hydraulic pressure restraining means, so that the hydraulic pressure is discharged from the reverse clutch without experiencing shelf pressure. This prevents the reverse clutch and low/reverse brake from being inter-locked.

During a shift from the neutral range to the reverse range under cold weather, bringing of the second hydraulic circuit into communication with the first hydraulic circuit downstream from the hydraulic pressure restraining means allows the hydraulic pressure supplied to the reverse clutch through the check valve to be partly introduced into the low/reverse brake bypassing the restraining means, so as to eliminate a deterioration in the responsiveness of the hydraulic circuit. In particular, because the accumulator produces shelf pressure in the hydraulic pressure supplied to the low/reverse brake during a shift from the neutral range to the reverse range and in the hydraulic pressure discharged from the reverse clutch during a shift from the reverse range to the neutral range, a considerable decrease in shift shock is attained during the neutral-to-reverse shift and vice versa. When the automatic transmission control system includes a one-way orifice for restraining supply of hydraulic pressure to the reverse brake and a hydraulic pressure accumulator for accumulation of hydraulic pressure in order to produce shelf pressure, both of which are disposed in the first hydraulic circuit, the hydraulic pressure slowly rises and is supplied to the low/reverse brake during a neutral-to-reverse shift. This causes the low/reverse brake to be locked slowly after locking of the reverse clutch, so as to provide a considerable decrease in shift shock during the neutral-to-reverse shift. On the other hand, during a reverse-to-neutral shift, because the second hydraulic circuit is not provided with any hydraulic pressure accumulation means but provided with a hydraulic pressure restraining means, such as a one-way orifice, for restraining discharge of hydraulic pressure, the hydraulic pressure is discharged earlier from the reverse clutch than from the low/reverse clutch. However, due to the restraining effect of the one-way orifice, the discharge of hydraulic pressure from the reverse clutch occurs relatively slowly. This results in gradual unlocking of the reverse clutch, and hence in a decrease in shift shock during the reverse-to-neutral shift. Furthermore, in the automatic transmission control system of the present invention, because hydraulic communication is connected and disconnected by a switching valve in the bypass hydraulic pressure line between the first and second hydraulic circuits, when the hydraulic communication is connected, the hydraulic pressure passes either one of the one-way orifices which have restraining effect in opposite directions. Accordingly, the hydraulic pressure is supplied or discharged at regulated rates or speeds, so as to ensure the responsiveness of the control system to shift operations. In particular, when the hydraulic communication is connected after unlocking of the reverse clutch, the hydraulic pressure is discharged from the reverse clutch passing through the one-way orifice having no effect of restraining of the hydraulic pressure being discharged, the discharge of the hydraulic pressure from the reverse clutch is made quickly. Accordingly, an inter-lock of the transmission mechanism, which is generally caused due to a delay of unlocking of the reverse clutch and locking of a frictional coupling element such as a forward clutch during a reverse-to-drive shift, is eliminated.

The automatic transmission control system may further include a switching valve having a drain port, disposed in the first hydraulic circuit downstream from the hydraulic pressure accumulator, which discharges the hydraulic pressure from the reverse brake. When, during discharging of the hydraulic pressure from the low/reverse clutch, the switching valve is caused so as to bring the first hydraulic circuit into communication with the drain port thereof, the hydraulic pressure is drained through the drain port closest to the low/reverse brake during a shift from the reverse range not only to the neutral range but also to the drive range. This enables quick dropping of the hydraulic pressure, accelerating unlocking of the low/reverse brake. On the other hand, the hydraulic pressure accumulated in the accumulator is quickly discharged passing through the one-way orifice having no effect of restraining of the hydraulic pressure being discharged, enabling the first hydraulic circuit to increase the discharging rate of hydraulic pressure. In addition, at a lapse of a predetermined time after the reverse-to-neutral shift, the bypass valve is caused to provide the hydraulic communication of the bypass hydraulic pressure line, and the switching valve is coincidently caused to bring its drain port into communication with the first hydraulic circuit downstream from the switching valve, so as to discharge the hydraulic pressure quickly from both reverse clutch and low/reverse brake and accordingly complete unlocking of them early. This enables the control system to be ready for another operation promptly, and hence certainly avoids an inter-lock of the transmission mechanism even if another shift is made to a forward range such as the drive range. In particular, because unlocking of the frictional coupling elements can be performed speedy even if the working oil has deteriorated fluidity due to cold weather conditions, the control system still operates with high responsiveness even under such cold weather conditions.

Because the switching valve and bypass valve are actuated at a time when the rotational speed of turbine has reached the appropriate predetermined speed after the completion of a shift from the reverse range to the neutral range, an increase in the amount of discharging hydraulic pressure is made at an appropriate timing.

Shift valves used to cause the frictional coupling elements to be locked and unlocked so as to provide the desired gears may be used in common with either one or both of the switching valve and bypass valve. This common use of the shift valves provides a decrease in the number of essential parts for the hydraulic control system and enables it to be configured simply.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 1 is a schematic illustration of an automatic transmission with which a control system of the present invention cooperates;

FIG. 3 is a block diagram showing a controller for various valves of the hydraulic control circuit of FIG. 2;

FIG. 11 is a time chart showing changes in control pressure for the reverse-to-neutral shift;

FIG. 13 is a block diagram showing a controller for various valves of the hydraulic control circuit of FIG. 12;

DETAILED DESCRIPTION OF THE PREFERRED EMBODIMENTS

Figure 2A:
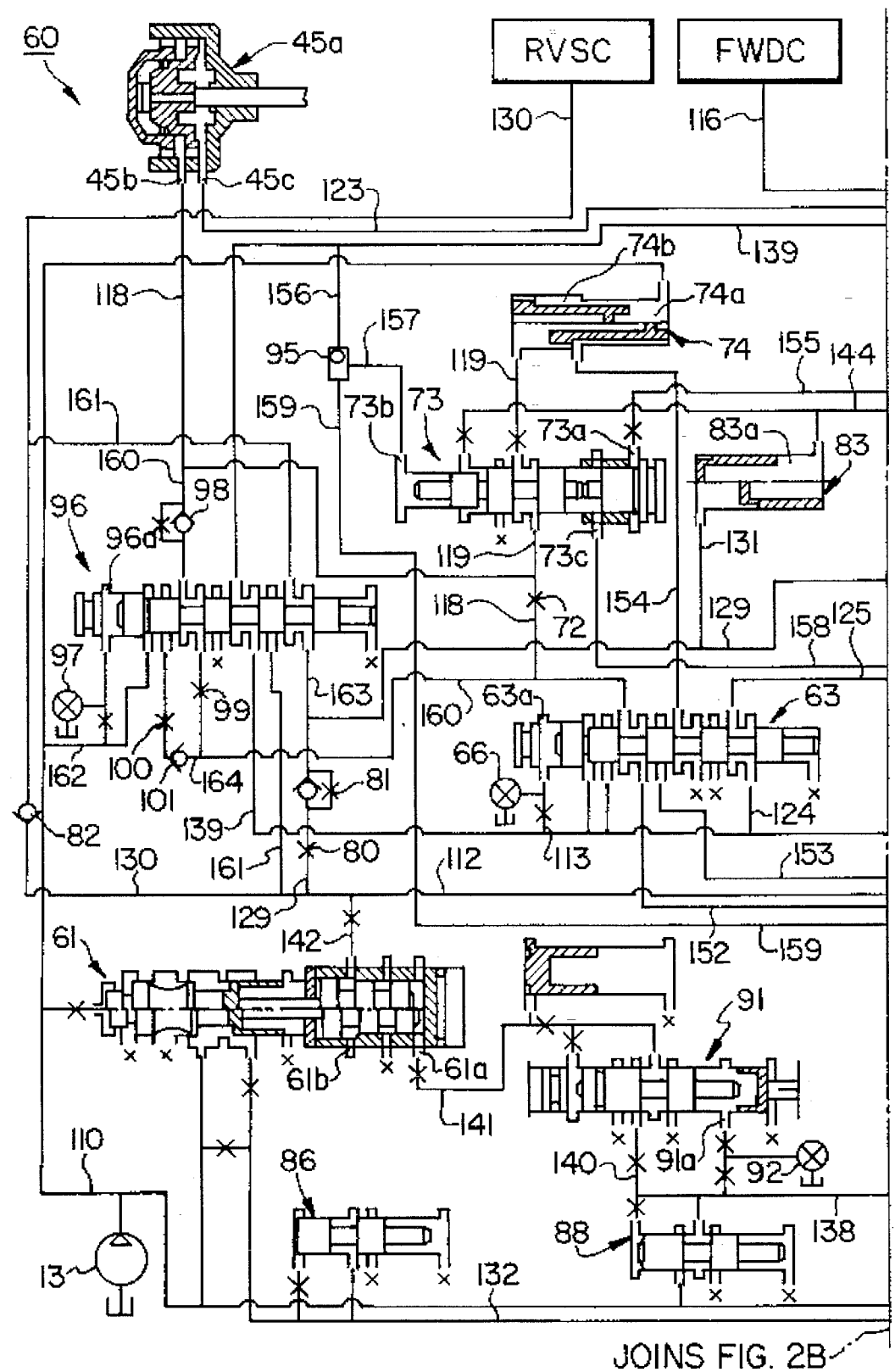
FIG. 2 is a diagram showing a hydraulic control circuit in accordance with a preferred embodiment of the present invention for the automatic transmission shown in FIG. 1.

Referring now to the drawings in detail, and in particular, to FIG. 1, an automatic transmission 10 equipped with a control system in accordance with a preferred embodiment of the present invention has a mechanical configuration including a torque converter 20 and a transmission gear mechanism 30. This transmission gear mechanism 30 includes various frictional coupling elements 41–46, such as clutches and brakes, and one-way clutches 51 and 52 which are selectively operated so as to provide different torque transferring paths of the transmission gear mechanism 30.

The torque converter 20, which multiplies engine torque, has a driving and driven torus generally referred to as a pump 22 and a turbine 23, respectively, and a stator 25. The pump 22 is placed within and secured to a housing 21 secured to a pump shaft 12. The turbine 23, which is secured to a hollow turbine shaft 27 functioning as an input shaft of the transmission gear mechanism 30, is placed within the housing 21 so as to face the pump 22 and driven by the pump 22 by means of a special lightweight oil. The stator 25 is inserted between the pump and turbine 22 and 23 and mounted on a transmission housing 11 through a one-way clutch 24 so as to be allowed to spin in the direction of the pump 22. As is well known, the stator intercepts the oil thrown off by the turbine 23 and redirects the path of this oil so as to cause the oil to enter the pump 23 smoothly so as to perform engine output torque transmission and multiplication. The torque converter 20 further has a lock-up clutch 26 placed between the housing 21 and the turbine 23 for mechanically locking the pump 22, and hence the pump shaft 12, and the turbine 23 together when it is activated. An engine output shaft 1 is directly connected to, or otherwise formed integrally with, the pump shaft 12 passing through the hollow turbine shaft 27 and drives an oil pump 13 disposed on the rear end of the automatic transmission 10 opposite to the torque converter 20 with respect to the transmission gear mechanism 30. By means of this torque converter 20, engine output torque is multiplied and transmitted to the transmission gear mechanism 30.

The transmission gear mechanism 30 is consisted by a Labinyo type of planetary gear 30A and various frictional coupling elements and one-way clutches. The planetary gear 30A comprises a small sun gear 31, a large sun gear 32 being larger in diameter than the small sun gear 31, a plurality of short pinion gears 33, a long pinion gear 34 being longer in axial length and larger in diameter than the short pinion gear 33, a carrier 35 and a ring gear 36. These sun gears 31 and 32 are loosely mounted side by side on the turbine shaft 27 in order from the torque converter 20. The small pinion gears 33 are arranged around and in external engagement with the small sun gear 31. The long pinion gear 34 is in internal engagement with both short pinion gears 33 and large sun gear 32 and in external engagement with the ring gear 36. These short pinion gears 33 and long pinion gear 34 are independently supported for rotation by the carrier 35.

The transmission gear mechanism 30 includes various frictional coupling elements and one-way clutches. These frictional coupling elements includes a forward clutch (FWD) 41 and a coast clutch (CST) 42 disposed in parallel with each other between the turbine shaft 27 and the small sun gear 31, a third/fourth (3/4) clutch (3/4) 43 disposed between the turbine shaft 27 and the carrier 35, a reverse clutch (RVS) 44 disposed between the turbine shaft 27 and the large sun gear 32, a second/fourth (2/4) brake 45 such as a band brake disposed between large sun gear 32 and the reverse clutch 44 for braking the large sun gear 32, and a low-speed/reverse brake 46 (LRV) disposed between the small sun gear 31 and the forward clutch 41. Further, a first one-way clutch (FOW) 51 is disposed in series with the forward clutch 41 between the small sun gear 31 and the forward clutch 41, and a second one-way clutch (SOW) 52 is disposed in parallel with the low-speed/reverse brake between the carrier 35 and the transmission housing 11. In this instance, the low-speed/reverse brake 46 is provided with a dish plate.

These frictional coupling elements 41–46 and one-way clutches and 52 are selectively activated so as to place the transmission gear mechanism 30 into desired gears as shown in Table I.

valve 61 for regulating pressure of a working oil discharged into a main pressure line 110 from the oil pump 13 to a certain level of line pressure, a range shift valve 62 which is manually operated to selectively place the automatic transmission 10 into any desired ranges, and first, second and third shift valves 63, 64 and 65 for selectively activating the frictional coupling elements 41–46 according to gear shifts to possible gears.

The range shift valve 62 is manually operated to select three forward ranges, namely the drive (D) range, the second speed (S) range and the low speed (L) range, the reverse (R) range, the neutral (N) range and the park (P) range. The range shift valve 62 is configured such that it brings the main pressure line 110 into communication with a forward clutch pressure line 111 when selecting any one of the forward ranges and with a reverse pressure line 112 when selecting the reverse (R) range.

The first shift valve 63 is provided at its one end with a control pressure port 63a which is in communication with the forward clutch pressure line 111 through a first control pressure line 113. Similarly, the second and third shift valves 64 and 65 are provided at their one ends with control pressure ports 64a and 65a, respectively, which are in communication with the forward clutch pressure line 111

TABLE I

| Range/Gear | FWD | CST | 3/4 | RVS | 2/4 | LRV | FOW | SOW |
|---|---|---|---|---|---|---|---|---|
| Park(P) | | | | | | | | |
| Reverse(R) | | | | o | | o | | |
| Neutral(N) | | | | | | | | |
| Drive | | | | | | | | |
| 1st | o | | | | | | o | o |
| 2nd | o | | | | o | | o | |
| 3rd | o | o | o | | | | o | |
| 4th | o | | o | | o | | | |
| Second | | | | | | | | |
| 1st | o | | | | | | o | o |
| 2nd | o | o | | | o | | o | |
| 3rd | o | o | o | | | | o | |
| Low | | | | | | | | |
| 1st | o | o | | | | o | o | o |
| 2nd | o | o | | | o | | o | |

Figure 2B:
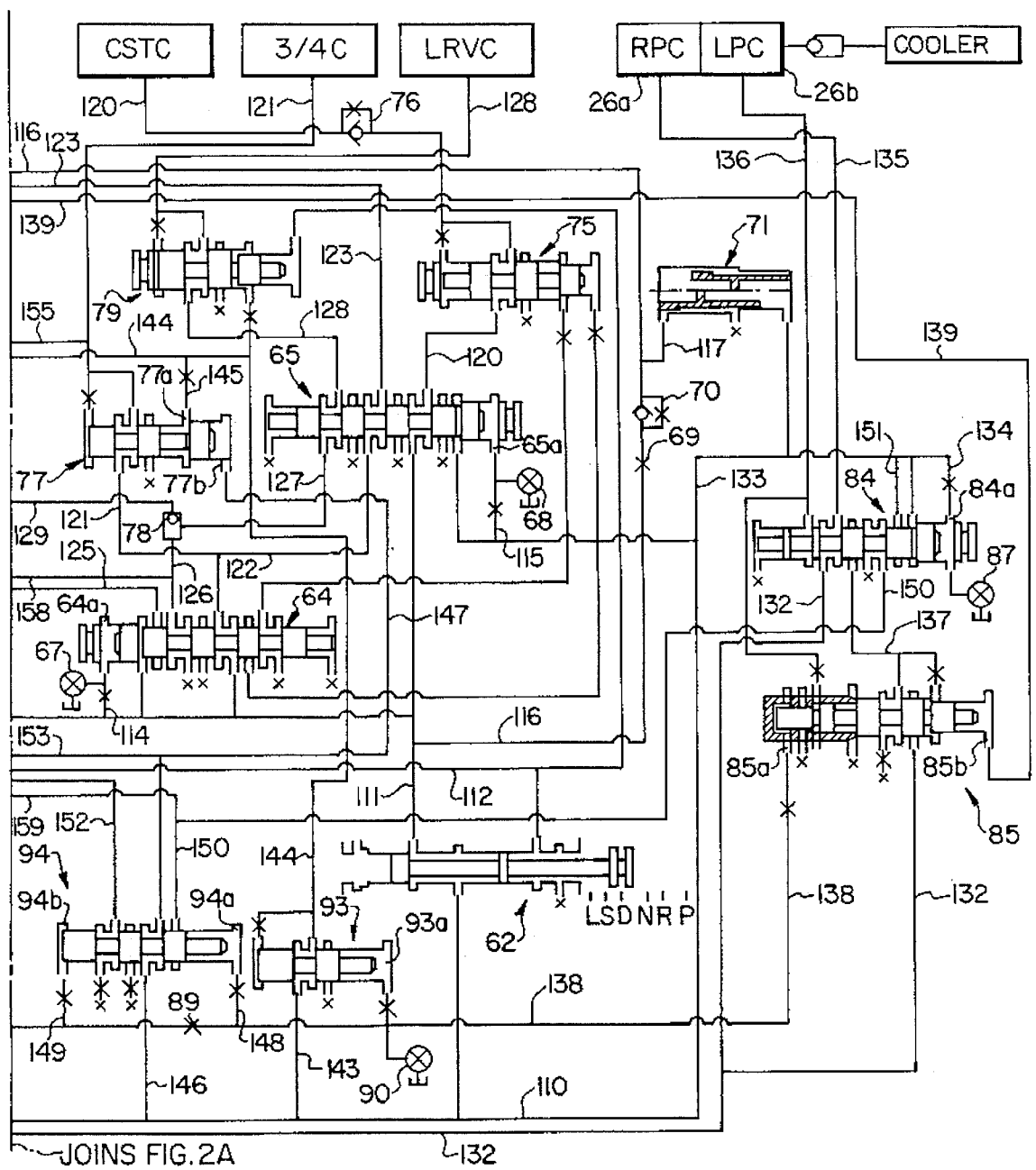

Referring to FIG. 2, the hydraulic control circuit 60 which cooperates with the automatic transmission 10 includes various actuators. One of the actuator, namely a 2/4 brake actuator 45a for the 2/4 brake 45 comprises a hydraulically controlled servo piston having a brake apply pressure port (which is referred to as an apply pressure port for simplicity) 45b and a brake release pressure port (which is referred to as a release pressure port for simplicity) 45c, which may take any type well known to those skilled in the art. This type of actuator 45a operates such that it activates to lock the 2/4 brake for brake application under the application of hydraulic pressure to the apply pressure port 45b only, and to unlock the same for brake release when both apply and release pressure ports 45b and 45c are applied with hydraulic pressure, when neither the apply pressure port 45b nor the release pressure port 45c is applied with any hydraulic pressure, and when only the release pressure port 45c is applied with hydraulic pressure. Each of the actuators other than the 2-4 brake actuator 45a comprises an ordinary hydraulically controlled piston which may also take any type well known to those skilled in the art. The hydraulic control circuit 60 further includes various valves, such as a regulator through a second control pressure line 114 and a third control pressure line 115, respectively. These first to third control pressure lines 113 to 115 are provided with first to third solenoid valves (SLDVs) 66, 67 and 68, respectively. The first solenoid valve 66 operates such that it drains a control pressure from the first shift valve 63 at the control pressure port 63a when energized or turned ON so as to displace its spool to the one end in the left hand side position (which is referred to as a left end position) as viewed in FIG. 2 and introduces a control pressure into the first shift valve 63 at the control pressure port 63a through the first control pressure line 113 when deenergized or turned OFF so as to displace the spool to another end in the right hand side position (which is referred to as a right end position) as viewed in FIG. 2 against a spring (not shown). Similarly, the second solenoid valve 67 operates such that it drains a control pressure from the second shift valve 64 at the control pressure port 64a when energized or turned ON so as to displace its spool 64b in the left end position and introduces a control pressure into the second shift valve 64 at the control pressure port 64a through the second control pressure line 114 when deenergized or turned OFF so as to displace the spool in the right end position against a spring (not shown). On the other hand, the third solenoid valve 68 operates such that it drains a control pressure from the third shift valve 65 at the control pressure port 65a when energized or turned ON so as to displace its spool 65b (see FIG. 4) in the right end position and introduces a control pressure into the third shift valve 65 at the control pressure port 65a through the third control pressure line 115 when deenergized or turned OFF so as to displace the spool in the left end position against a spring (not shown). These first to third solenoid valves 66 to 68 are energized and deenergized or turned ON and OFF by a controller (which will be described in detail later) in various operative patterns predetermined according to vehicle speeds and engine throttle openings so as to selectively activate the frictional coupling elements 41 to 46 as shown in Table I for shifting the automatic transmission 10 into the 1st to 4th gears. The operative patterns of the solenoid valves are shown in Table II.

TABLE II

| Range | D Range | | | | S Range | | | L range | |
|---|---|---|---|---|---|---|---|---|---|
| Gear | 1st | 2nd | 3rd | 4th | 1st | 2nd | 3rd | 1st | 2nd |
| 1st SLDV | OFF | ON | ON | ON | OFF | ON | ON | OFF | ON |
| 2nd SLDV | ON | ON | OFF | OFF | ON | ON | OFF | ON | ON |
| 3rd SLDV | ON | ON | OFF | ON | ON | OFF | OFF | OFF | OFF |

A forward clutch pressure line 116 branches off from the forward clutch pressure line 111 which is brought into communication with the main pressure line 110 when the range shift valve 62 is operated so as to select any one of the forward ranges, namely the drive (D) range, the second speed (S) range and the low speed (L) range, and leads to the forward clutch 41 via a bi-directional or two-way orifice 69 and an one-way orifice 70. Through the forward clutch pressure line 116 the forward clutch 41 is always applied locking pressure in each of the drive (D) range, the second speed (S) range and the low speed (L) range. The forward clutch pressure line 111, leading to the first shift valve 63, is brought into communication with a brake apply pressure line 118 when the first shift valve 63 is forced to displace its spool into the left end position resulting from energization of the first solenoid valve 66, introducing hydraulic pressure into the 2/4 brake actuator 45a at the apply pressure port 45b via a two-way orifice 72. Consequently, when the first solenoid valve 66 is energized or turned ON in the forward ranges, in other words, when hydraulic pressure is introduced into the 2/4 brake actuator 45a only at the apply pressure port 45b at the 2nd, 3rd or 4th gear in the drive (D) range, at the 2nd or 3rd gears in the second speed (S) range, and at the 2nd gear in the low speed (L) range, the 2/4 brake 45 is applied.

The forward clutch pressure line 111 also leads to the third shift valve 65 and is brought into communication with a coast clutch pressure line 120 when the third shift valve 65 is forced to displace its spool 65b into the left end position resulting from deenergization of the third solenoid valve 68. This coast clutch pressure line 120 leads to the coast clutch 42 via a reducing valve 75 and a one-way orifice 76. Consequently, when the third solenoid valve 68 is deenergized or turned OFF in the forward ranges, in other words, at the 3rd gear in the drive (D), at the 2nd gear or the 3rd gear in the second speed (S) range, and the 1st gear or 2nd gear in the low speed (L) range, the coast clutch 42 is locked.

The forward clutch pressure line 111 further leads to the second shift valve 64 and is brought into communication with a 3/4 clutch pressure line 121 leading to the 3/4 clutch 43 via a control valve 77 when the second shift valve 64 is forced to displace its spool into the right end position resulting from deenergization of the second solenoid valve 67. By means of this 3/4 clutch pressure line 121, when second solenoid valve 67 is deenergized or turned OFF in the forward ranges., in other words, at the 3rd or 4th gear in the drive (D) range and at the 3rd gear in the second speed (S) range, the 3/4 clutch 43 is locked. In this instance, a pressure line 122 branching off from the 3/4 clutch pressure line 121 leads to the third shift valve 65 and is brought into communication with a brake release pressure line 123 leading to the release pressure port 45c of the actuator 45a when the third shift valve 65 is forced to displace its spool 65b into the left end position resulting from energization of the third solenoid valve 68. Consequently, when both second and third solenoid valves 67 and 68 are deenergized or turned OFF in the forward ranges, in other words, at the 3rd gear in the drive (D) range and in the second speed (S) range, release pressure is introduced into the actuator 45a at the release pressure port 45c, releasing the 2/4 brake 45.

A pressure line 124 branching off from the forward clutch pressure line 111 and leading to the first shift valve 63 is brought in communication with a pressure line 125 leading to the second shift valve 64 when the first shift valve 63 is forced to displace its spool into the right end position resulting from deenergization of the first solenoid valve 66. On the other hand, a pressure line 126, which is connected to the second shift valve 64 and brought into communication with the pressure line 125 when the second shift valve 64 is forced to displace its spool into the left end position resulting from energization of the second solenoid valve 67, leads to the third solenoid valve 68 through a pressure line 127 via a ball valve 78. This pressure line 127 is brought into communication with a low-speed/reverse brake pressure line 128 connected to the low-speed/reverse brake 46 through a reducing valve 79 when the third shift valve 65 is forced to displace its spool 65b into the left end position resulting from deenergization of the third solenoid valve 68. In other words, the first to third solenoid valves 66 to 68 are deenergized, energized and deenergized or turned OFF, On and Off, respectively, in the forward ranges, in other words, at the 1st gear in the low speed (L) range, the low-speed/reverse brake 46.

The reverse pressure line 112, which is in communication with the main pressure line 110 in the reverse (R) range, leads: to the third shift valve 65 through a pressure line 129 branching off from the reverse pressure line 112 and provided with a two-way orifice 80 and a one-way orifice 81 and then the pressure line 127 connected to the pressure line 129 via the ball valve 78. This reverse pressure line 112 is brought into communication with the low-speed/reverse brake pressure line 128 when the third shift valve 65 is forced to displace its spool 65b into the left end position resulting from deenergization of the third solenoid valve 68. This reverse pressure line 112 also leads to the reverse clutch 44 through a reverse clutch pressure line 130 connected to the reverse pressure line 112 through a check valve 82. Accordingly, in the drive (D) range, the reverse clutch 44 is held locked,, while the low-speed/reverse brake 46 is applied when the third solenoid valve 68 is deenergized or turned OFF. In this instance, the forward clutch pressure line 116 is connected to a neutral/drive (N/D) accumulator 71 through a pressure line 117. Further, the brake apply pressure line 118 is connected to a first/second (1/2) accumulator 74 through a pressure line 119 in which an accumulation cut valve 73, and the pressure line 129 is connected to a neutral/reverse (N/R) accumulator 83 through a pressure line 131 branching off from the pressure line 129 between the one-way orifice 81 and the ball valve 78.

The hydraulic control circuit 60 further includes a torque converter shift valve or fourth shift valve 84 and a lock-up control valve 85 for activating the lock-up clutch 26 of the torque converter 20. A converter shift pressure line 132 extending from the regulator valve 61 and provided with a relief valve 86 is connected to both fourth shift valve 84 and lock-up control valve 85. Further, a pressure line 134, which extends from a pressure line 133 branching off from the main pressure line 110, is connected to the fourth shift valve 84 at its control pressure port 84a where a fourth solenoid valve 87 is connected. The fourth shift valve 84 is forced to place its spool into the left end position when the fourth solenoid valve 87 is deenergized or turned OFF so as to bring the converter shift pressure line 132 into communication with a release pressure line 135 leading to a release pressure chamber (RPC) 26a of the torque converter 20. When the release pressure chamber (RPC) 26a is supplied with working oil as a control pressure, the lock-up clutch 26 is unlocked so as to release the torque converter 10 and enable it to allow slippage. On the other hand, when the fourth solenoid valve 87 is energized or turned ON and drains the working oil from the fourth shift valve 84 through the control pressure port 84a, the fourth shift valve 84 allows the spool to move into the left end position, bringing the converter shift pressure line 132 into communication with a lock-up release pressure line 136 leading to a lock-up pressure chamber (LPC) 26b of the torque converter 20. When the lock-up pressure chamber (LPC) 26b is supplied with working oil as a control pressure, the lock-up clutch 26 is locked so as to mechanically lock the pump and turbine 22 and 23 of the torque converter 10 together. At this time, the release pressure line 135 is brought into communication with a connecting pressure line 137 leading to the lock-up control valve 85 through the fourth shift valve 84, applying working oil regulated in pressure level by the lock-up control valve 85 as a release pressure to the release pressure chamber (RPC) 26a of the lock-up clutch 26.

In other words, the lock-up control valve 85 is connected at the control pressure port 85a provided at one end thereof to a control pressure line 138 leading from the main pressure line 110 via a reducing valve 88 and at a regulation-interruption pressure port 85b provided at another end thereof to a regulation-interruption pressure line 139 leading to the forward clutch pressure line 111. A first duty solenoid valve 90 provided in the control pressure line 138 downstream from a two-way orifice 89 as viewed from the reducing valve 88 regulates the control pressure to be supplied to the lock-up control valve 85 at the control pressure port 85a according to duty rates at which it periodically opens and closes. On condition of no supply of line pressure to the lock-up control valve 85 at the regulation-interruption pressure port 85b through the regulation-interruption pressure line 139, the first duty solenoid valve 90 regulates the difference between a lock-up pressure supplied into the lock-up pressure chamber (LPC) 26b of the lock-up clutch 26 through the converter shift pressure line 132 and the lock-up pressure line 136 and a release pressure supplied into the release pressure chamber (RPC) 26a of the lock-up clutch 26 through the release pressure line 135 and the connecting pressure line 137, placing the lock-up clutch 26 to allow slippage. On the other hand, when a line pressure is supplied to the lock-up control valve 85 at the regulation-interruption pressure port 85b through the regulation-interruption pressure line 139, the lock-up control valve 85 holds its spool displaced in the left end position, so as to drain the working oil in the release pressure chamber (RPC) 26a of the torque converter 20 through the release pressure line 135 and the connecting pressure line 137 via the fourth shift valve 84, thereby causing the lock-up clutch 26 to mechanically lock the pump and turbine 22 and 23 of the torque converter 10 together. In this instance, the lock-up control valve 85 is provided with an orifice (not shown) at the drain port designed and adapted to prevent the working oil from being drained in excess even when the working oil flows into the release pressure chamber (RPC) 26b from the lock-up pressure chamber (LPC) 26a through the lock-up pressure line 136. Besides, since the lock-up clutch 26 is changed between a locked up condition and a slipping condition by controlling the supply of line pressure to the lock-up control valve 85 at the control pressure port 85a, if the control valve 85 has a narrow controllable range of pressure, the lock-up clutch 26 is locked with accurately controlled locking pressure in a slipping mode. In addition, the first duty solenoid valve 90 is designed and adapted to provide a decrease in pressure level with an increase in duty rate D1. Specifically, when the first duty solenoid valve 90 operates at a duty rate D1 of 100%, the lock-up control valve 85 functions with its drain port always opened, decreasing the pressure level in the converter shift pressure line 132 downstream from the two-way orifice 89 to the level of zero (0). Contradistinctly, when the first duty solenoid valve 90 operates at a duty rate D1 of 0%, the lock-up control valve 85 functions with its drain port always closed, holding the pressure in the converter shift pressure line 132 downstream from the two-way orifice 89 at the highest level.

The hydraulic control circuit 60 also includes a pressure modulation valve 91 for controlling the line pressure regulated by the regulator valve 61 and a second duty solenoid valve 92 for causing the modulation valve 91 to perform pressure modulation. This pressure modulation valve 91 is connected to a pressure line 140 leading to the main pressure line 110 through the reducing valve 88. A control pressure regulated by the second duty solenoid valve 92 periodically opening and closing at duty rates D2 is introduced into the modulation valve 91 at its control pressure port 91a so as to cause the modulation valve 91 to produce a modulated pressure according to the duty rates D2. In this instance, the duty rate D2 is established according, for instance, to engine throttle openings. This modulated control pressure corresponding to an engine throttle opening is introduced into the regulator valve 61 at its first pressure increase port 61a through a pressure line 141, causing the regulator valve 61 to increase the line pressure according to an increase in throttle opening. On the other hand, the regulator valve 61 is connected at its second pressure increase port 61b to a pressure line 142 branching off from the reverse pressure line 112 so as to increase the line pressure more higher in the reverse (R) range. The control pressure which is regulated as lock-up pressure for the lock-up clutch 26 by the first duty solenoid valve 90 is also introduced into a modulation valve 93 at its control pressure port 93a. This modulation valve 93 modulates the line pressure introduced therein through a pressure line 143 branching off from the main pressure line 110 according to the control pressure regulated by the first duty solenoid valve 90 and supplies the modulated control pressure into a back pressure chamber of the N/R accumulator 83 through a pressure line 144.

In this instance, because the control valve 77 provided in the 3/4 clutch pressure line 121 is connected at its control pressure port 77a to a pressure line 145 branching off from the pressure line 144, activation of the first duty solenoid valve 90 at a duty rate D1 causes the modulation valve 93 to produce a modulated pressure according to the duty rate D1 and supply it into the control valve 77. Accordingly, the control valve 77 produces a locking pressure for the 3/4 clutch according to the duty rate D1. On the other hand, the control valve 77 is connected at its regulation-interruption pressure port 77b to a regulation-interruption pressure line 147 leading to the main pressure line 110 through a pressure line 146 via a switching valve 94. When the switching valve 94 communicates the regulation-interruption pressure line 147 with the pressure line 146, The line pressure is introduced into the control valve 77 at the regulation-interruption pressure port 77b from the main pressure line 110 and interrupts the regulative operation of the control valve 77. More specifically, the switching valve 94 is connected at its control pressure port 94a at its one end to a pressure line 148 branching off from the control pressure line 138 between the two-way orifice 89 and the first duty solenoid valve 90 and at a balancing pressure port 94b at another end thereof to a pressure line 149 branching off from the control pressure line 138 upstream from the two-way orifice 89. The switching valve 94 forces its spool in the left end position when the control pressure produced by the first duty solenoid valve 90 is above a predetermined level, it brings the regulation-interruption pressure line 147 into communication with the main pressure line 110 through the pressure line 146. As a result, the line pressure is introduced into the control valve 77 at the regulation-interruption pressure port 77b from the main pressure line 110, so as to interrupt the regulative operation of the control valve 77. On the other hand, when the control pressure produced by the first duty solenoid valve 90 drops below the predetermined level, the switching valve 94 forces its spool in the left end position, so as to disconnect the communication between the regulation-interruption pressure line 147 and the pressure line 146.

The switching valve 94 is further connected to a pressure line 150 leading to the fourth shift valve 84. This pressure line 150 is brought into communication with the regulation-interruption pressure line 147 when the switching valve 94 forces the spool in the right end position and also with a pressure line 151 leading to the main pressure line 110 through the pressure line 133 when the fourth shift valve 84 forces the spool in the left end position. In other words, when the locking pressure of the lock-up clutch 26 is controllable during energization or turning ON of the fourth solenoid valve 87, the line pressure is introduced into the regulation-interruption pressure line 147 through the pressure line 133, and the pressure lines 151 and 150 via the fourth shift valve 84. When the fourth shift valve 84 forces the spool in the left end position for controlling of the lock-up clutch 26 to cause the torque converter 20 to allow some slippage, it brings the pressure line 150 into communication with a drain port thereof. The switching valve 94 is further connected to a pressure line 152 which is brought into communication with the brake apply pressure line 118 when the first shift valve 63 forces the spool in the right end position, or otherwise which is brought into communication selectively with drain ports (not shown) which drain at different rates. The first shift valve 63 is connected to a pressure line 153 branching off from the regulation-interruption pressure line 147 and when it forces its spool in the left end position it brings the pressure line 153 into communication with a pressure line 154 leading to a second back pressure chamber 74b of the 1/2 accumulator 74 whose first back pressure chamber 74a is always supplied with the line pressure from the main pressure line 110. Accordingly, while the line pressure is supplied with the regulation-interruption pressure line 147, it is also supplied into the second back pressure chamber 74b of the 1/2 accumulator 74 through the pressure lines 153 and 154 only when the first shift valve 63 holds the spool in the left end position.

The accumulation cut valve 73 is connected at its control pressure port 73a provided at its one end to a pressure line 155 branching off from the 3/4 clutch pressure line 121 downstream from the control valve 77 and at its accumulation cut interruption pressure port 73b provided at another end to a pressure line 157 leading to the regulation-interruption pressure line 139 of the lock-up control valve 85 through a pressure line 156 via a ball valve 95. The accumulation cut valve 73 is further connected at its intermediate port 73c provided at its middle to a pressure line 158 branching off from the pressure line 126 leading to the second shift valve 64. The ball valve 95 is disposed between the pressure line 156 and a pressure line 159 branching off from the pressure line 150 leading between the switching valve 94 and the fourth shift valve 84.

The hydraulic control circuit 60 further includes a fifth shift valve 96 for controlling gear shift timing. This fifth shift valve 96 is connected to a first bypass pressure line 160 bypassing the two-way orifice 72 disposed in the brake apply pressure line 118, a second bypass pressure line 161 bypassing the check valve 82 disposed in the reverse clutch pressure line 130, a control pressure line 162 branching off from the main pressure line 110, and the regulation-interruption pressure line 139 leading to the lock-up control valve 85. With energization and deenergization or turning ON and OFF of a fifth solenoid valve 97 connected to the control pressure line 162 the fifth shift valve 96 displaces its spool between the left and right end positions so as to open and close selectively the first and second bypass pressure lines 160 and 161 and the regulation-interruption pressure line 139.

Specifically, when the fifth solenoid valve 97 is deenergized or turned OFF, the fifth shift valve 96 forces the spool in the right end position, so as, on one hand, to open both first bypass pressure line 160 and regulation-interruption pressure line 139 and, on the other hand, to close the second bypass pressure line 161. In this state, the second bypass pressure line 161 is brought into communication with the pressure line 163, provided with a two-way orifice 80 and a one-way orifice 81, branching off from the pressure line 129 and hence with both reverse clutch pressure line 130 and reverse pressure line 112. On the other hand, when the fifth solenoid valve 97 is energized or turned ON, the fifth shift valve 96 forces the spool in the left end position, so as, on one hand, to close both first bypass pressure line 160 and regulation-interruption pressure line 139 and, on the other hand, to open the second bypass pressure line 161.

The first bypass pressure line 160 includes a one-way orifice 98 provided downstream from the fifth shift valve 96 which is effective in restricting a working oil flowing toward the actuator 45a and a two-way orifice 99 provided upstream from the fifth shift valve 96. A pressure line 164, which branches off from the first bypass pressure line 160 downstream from the two-way orifice 99, is provided with a two-way orifice 100 which restricts a working oil flow at a rate smaller than the two-way orifice 99 and a one-way valve 101 for interrupting a working oil flow toward the fifth shift valve 96. The pressure line 164 is brought into communication with the second bypass pressure line 161 when the fifth solenoid valve 97 is energized or turned ON so as to displace the spool into the left end position.

Figure 4:
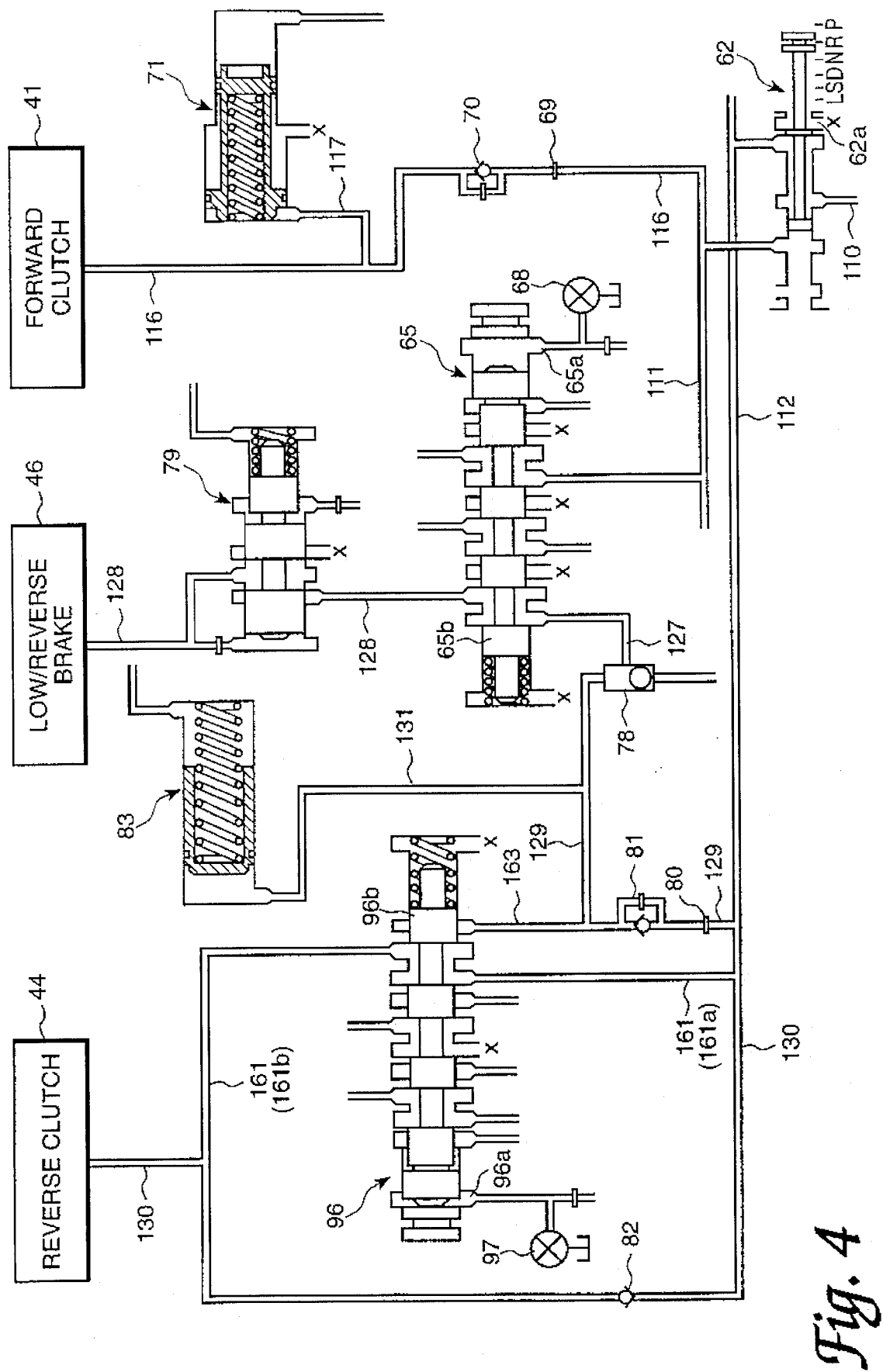
FIG. 4 is an enlarged diagram showing an essential part of the hydraulic control circuit when a shift is made from a neutral range to a reverse range.

These first to third solenoid valves 66–68, 87 and 97, and first and second duty solenoid valves 90 and 92 are operated by means of a controller 200 shown in FIG. 4.

Referring to FIG. 3, the controller 200 receives various signals, such as a signal from a speed sensor 201 representative of a vehicle speed, a signal from a throttle opening sensor 202 representative of an opening of an engine throttle, a signal from a position sensor 203 representative of a selected range position, a signal from a speed sensor 204 representative of an engine speed, a signal from a speed sensor 205 representative of a turbine speed, and a signal from a temperature sensor 206 representative of a temperature of the working oil in the hydraulic control circuit 60. These sensors 201–206 are well known in the art and may take any known type. According to these signals indicating driving conditions and driver's demands, the controller 200 controls the solenoid valves 66–68, 87, 90, 92 and 97.

Figure 5:
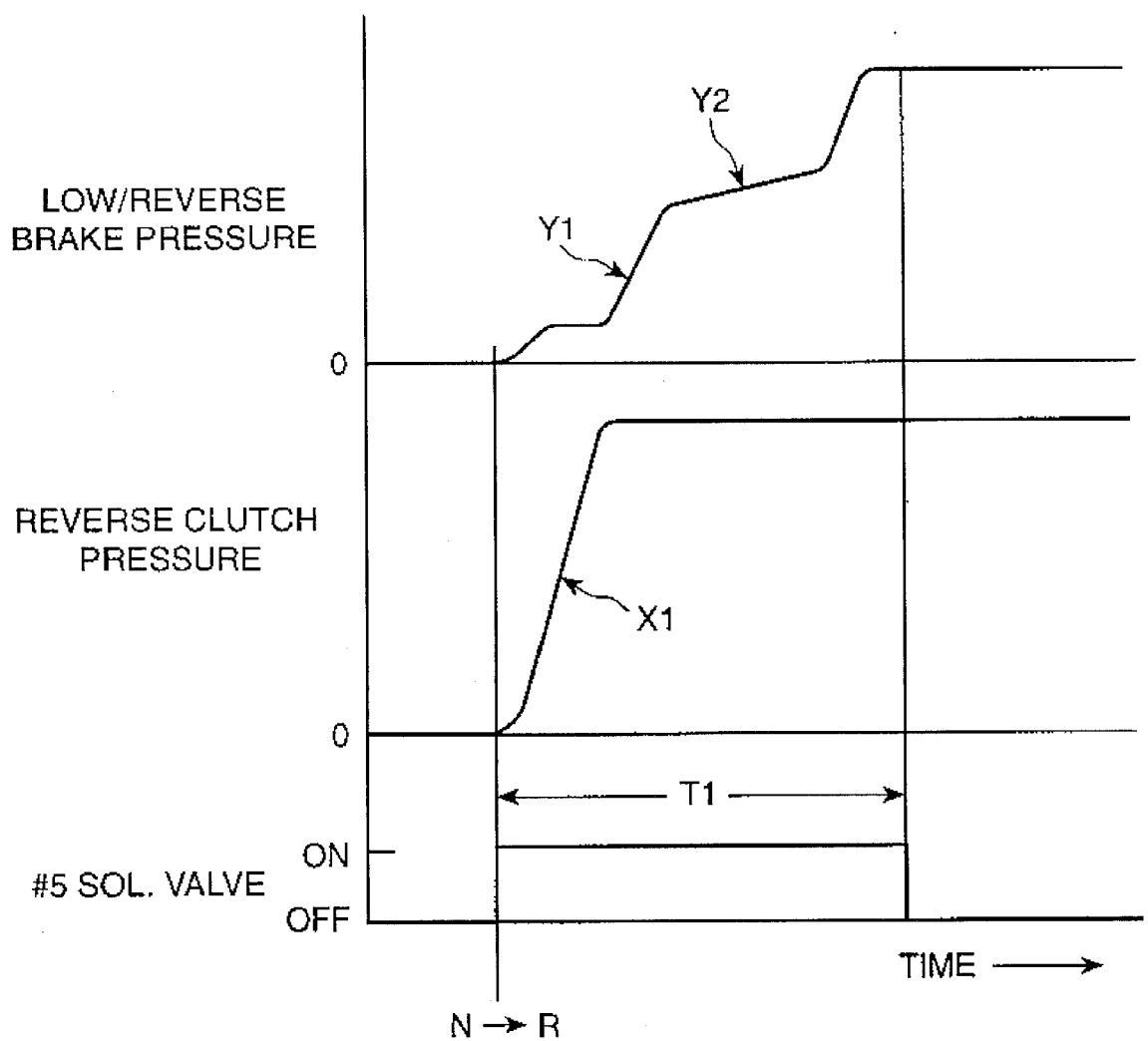
FIG. 5 is a time chart showing changes in hydraulic pressure during the neutral-to-reverse shift.

Specifically, when the controller 200 receives a position signal indicating an N-R shift from the position sensor 203, it turns the fifth solenoid valve 97 ON if receiving a temperature signal indicating a temperature of the working oil in the hydraulic control circuit 60 higher than a predetermined critical temperature from the temperature sensor 206. As a result, as shown in FIG. 4, the fifth shift valve 96 forces the spool 96b (see FIG. 4) into the left end position, so as to bring upstream and downstream 161a and 161b of the second bypass pressure line 161 with each other, thereby forcing the working oil discharged into the reverse pressure line 112 from the main pressure line 110 through the range shift valve 62 to be supplied to the reverse clutch 44 through both reverse clutch pressure line 130 and second bypass pressure line 161. Accordingly, as shown by a reference character X1 in FIG. 5, the reverse clutch pressure linearly rises promptly immediately after the commencement of the N-R shift, so as to cause a quick lock of the reverse clutch 44. At this time, the working oil is supplied to the low/reverse brake 46 from the reverse pressure line 112 through the pressure line 129 branching off from the reverse pressure line 112, the pressure line 127 connected to the pressure line 129 via the ball valve 78, and the low-speed/reverse brake pressure line 128. Because the pressure line 129 is provided with the two-way orifice 80 and one-way orifice 81 and leads to the N/R accumulator 83 through the pressure line 131, the low/reverse brake pressure linearly rises promptly immediately after the commencement of the N-R shift as shown by a reference character Y1 in FIG. 5, and thereafter it rises sluggishly by way of a predetermined incline of shelf pressure under action of the N/R accumulator 83 as shown by a reference character Y2. This rise in the low/reverse brake pressure causes the low/reverse brake to be locked with a delay from locking of the reverse clutch 44. At a lapse of predetermined time T1 after the detection of the N-R shift, the controller 200 turns the fifth solenoid valve OFF so as to return the fifth shift valve 96 to its initial state wherein the spool 96b is placed in the right end position.

As described above, because the low/reverse brake 46 is locked with a delay from locking of the reverse clutch 44 during an N-R shift, so as to reduce greatly shift shocks when the automatic transmission is placed into the reverse (R) range. In this instance, the provision of dish plate in the low/reverse brake 46 enhances the reduction in shift shock.

In the event that the controller 200 receives a temperature signal indicating a temperature of the working oil lower than the predetermined critical temperature from the temperature sensor 206, it maintains the fifth solenoid valve 97 turned OFF. As a result, the fifth shift valve 96 shifts the spool 96b toward the right end position, forcing the working oil having passed through the check valve 82 in the reverse clutch pressure line 130 and entered into the downstream portion 161b of the second bypass pressure line 161 to flow into the pressure line 163 branching off from the pressure line 129 downstream from the one-way orifice 81. As a result, since the low/reverse brake 46 is supplied quickly with locking pressure, the automatic transmission 10 does not encounter any deterioration in responsiveness.

Figure 7:
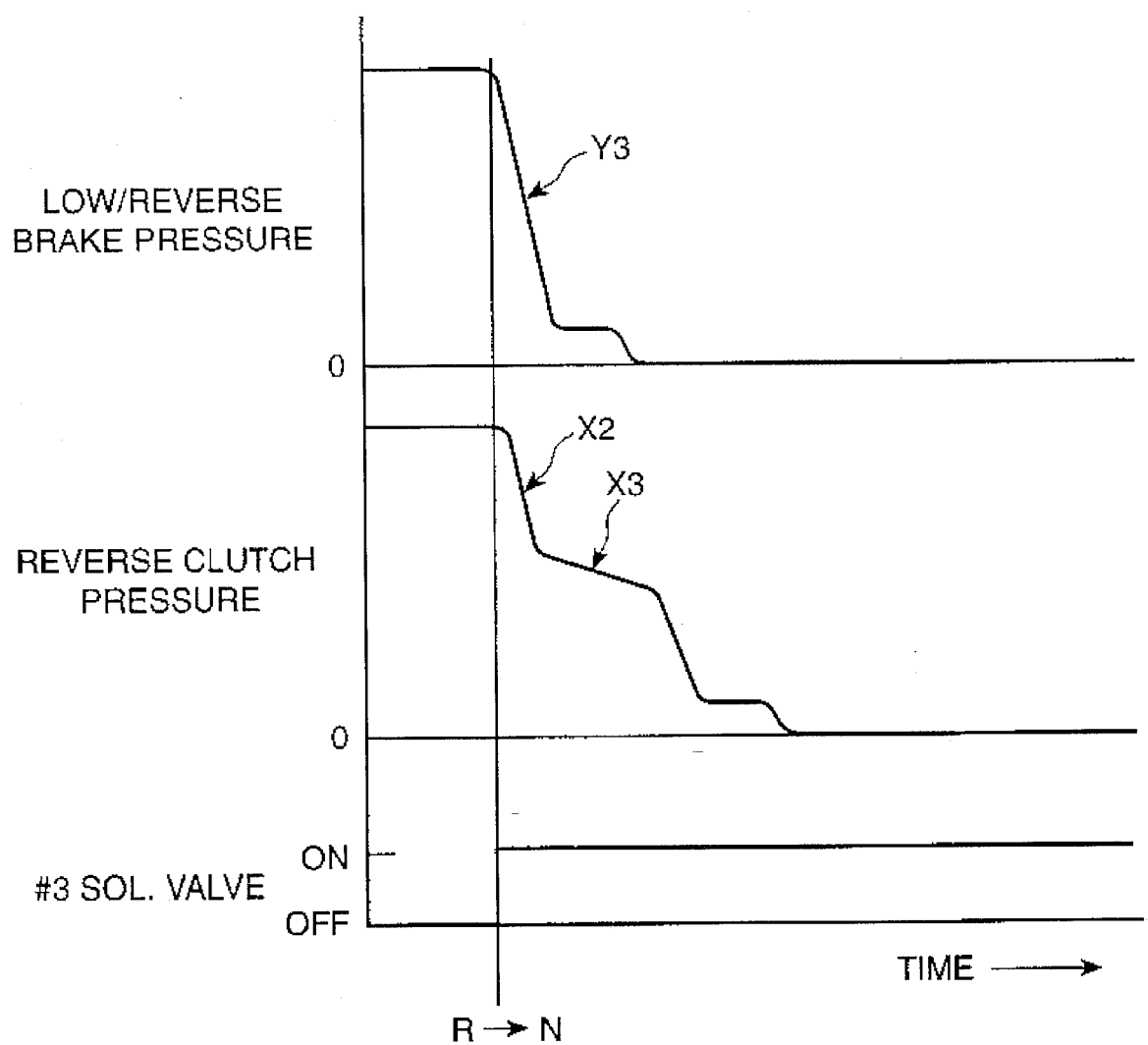
FIG. 7 is a time chart showing changes in control pressure for the reverse-to-neutral shift.

When the controller 200 receives a position signal indicating an R-N shift from the position sensor 203, it turns the third solenoid valve 68 ON, forcing the third shift valve 65 to place its spool 65b into the right end position. As a result, the low/reverse brake pressure line 128 is brought into communication with the drain port 65c thereof, so as to disconnect the communication of the low/reverse brake pressure line 128 from the N/R accumulator 83, thereby linearly lowering low/reverse brake pressure immediately after the commencement of the R-N shift as shown by a reference character Y3 in FIG. 7. At the time of turning OFF of the fifth solenoid valve 97, the working oil having been supplied to the reverse clutch 44 enters into the pressure line 163 through the downstream portion 161b of second bypass pressure line 161 via the fifth shift valve 96 with its spool 96b placed in the right end position and then is discharged from the reverse pressure line 112 through the range shift valve 62 at the drain port 62a via the two-way orifice 80, and the working oil having been in the N/R accumulator 83 is discharged from the reverse pressure line 112 through the range shift valve 62 at the drain port 62a via the two-way orifice 80. As a result, the reverse clutch pressure linearly lowers quickly immediately after the commencement of the R-N shift as shown by a reference character X2 in FIG. 7, and thereafter sluggishly by way of a predetermined incline of shelf pressure under the action of the N/R accumulator 83 as shown by a reference character X3. This causes the reverse clutch 44 to be unlocked with a delay from unlocking of the low/reverse brake 46, so as to enable the automatic transmission 10 to operate without shift shocks during R-N shifts.

Figure 8:
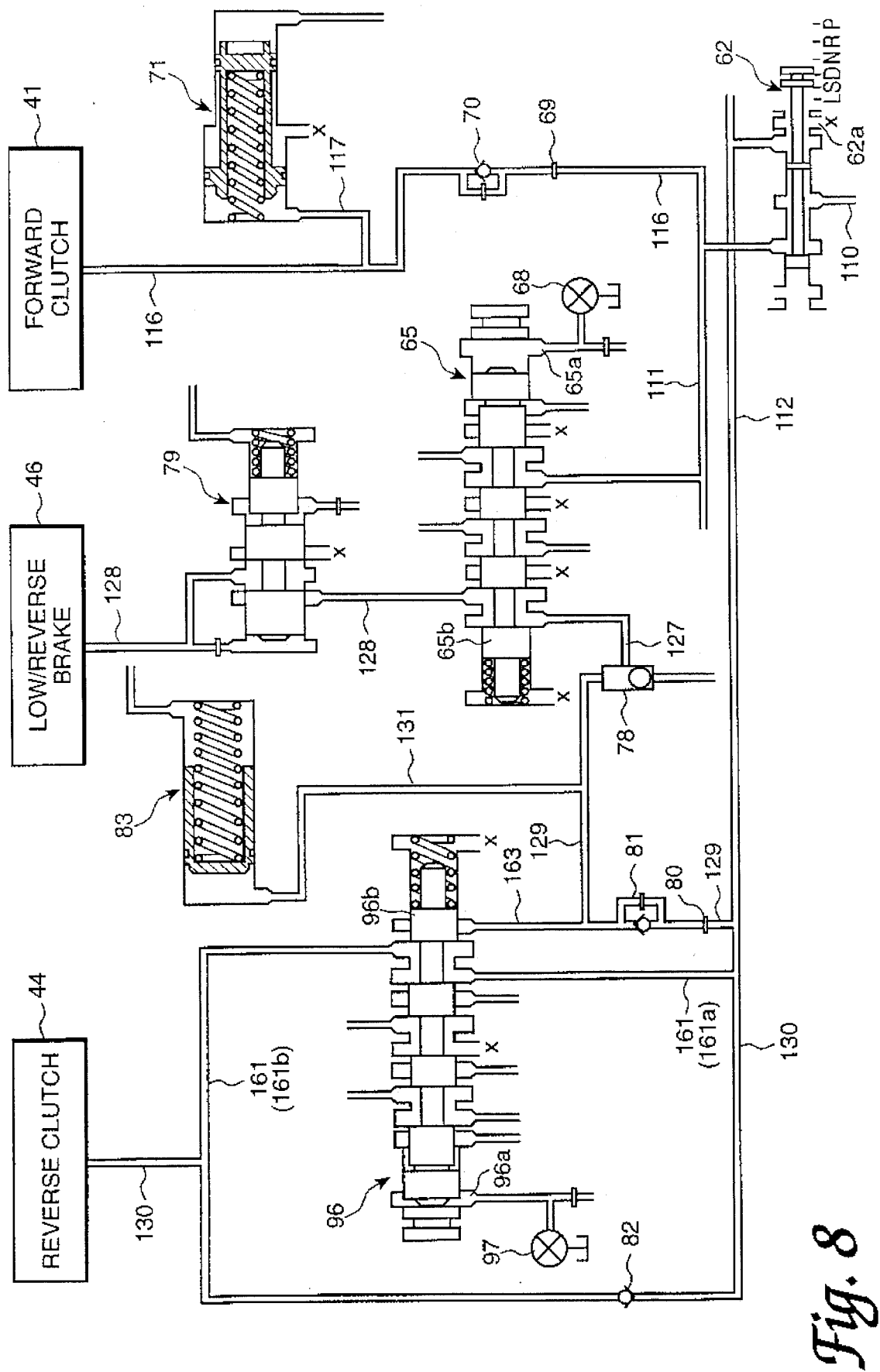
FIG. 8 is an enlarged diagram showing an essential part of the hydraulic control circuit when a shift is made from the reverse range to a drive range.

On the other hand, when the controller 200 receives a position signal indicating an R-D shift from the position sensor 203, it turns the fifth solenoid valve 97 ON, forcing the fifth shift valve 96 to place its spool 96b into the left end position as shown in FIG. 8. As a result, the upstream and downstream portions 161a and 161b of second bypass pressure line 161 are brought into communication with each other, forcing the working oil having been supplied to the reverse clutch 44 to enter into the upstream portion 161a from the downstream portion 161b of second bypass pressure line 161 and then to be discharged from the reverse pressure line 112 through the range shift valve 62 at the drain port 62a. In this instance, because there is provided any orifice or the like in the upstream portion 161a of second bypass pressure line 161, the reverse clutch pressure linearly lowers quickly immediately after the commencement of the R-D shift as shown by a reference character X4 in FIG. 9, causing the reverse clutch 44 to be unlocked quickly. At the same time, during the R-D shift, the working oil discharged into the forward clutch pressure line 111 from the main pressure line 110 through the range shift valve 62 is supplied to the forward clutch 41 through the forward clutch pressure line 116. Since the forward clutch pressure line 116 is provided with the two-way orifice 69 and one-way orifice 70 and is connected to the (N/D) accumulator 71 through the pressure line 117, the forward clutch pressure rises promptly immediately after the commencement of the R-D shift as shown by a reference character Z1 in FIG. 9, and thereafter it rises sluggishly by way of a predetermined incline of shelf pressure under the action of the N/D accumulator 83 as shown by a reference character Z2. Because the reverse clutch pressure lowers quickly without a transitional accompaniment of a gentle incline of shelf pressure immediately after the commencement of an R-D shift, the reverse clutch 44 has been completely unlocked before the commencement of locking of the forward clutch 41 as a result of the transition of the forward clutch pressure, so as to prevent the transmission gear mechanism 30 from encountering an inter-lock.

Figure 6:
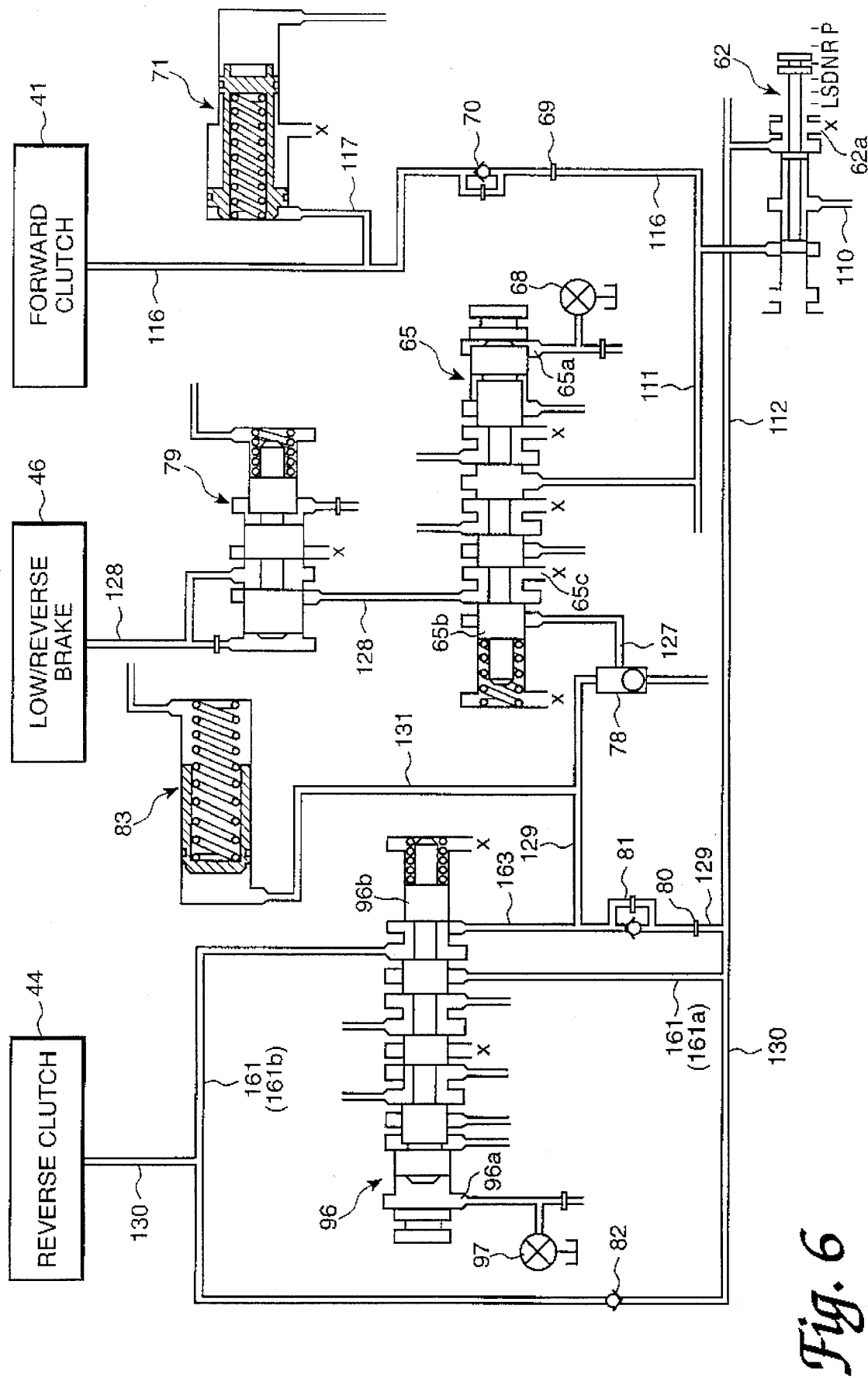
FIG. 6 is an enlarged diagram showing an essential part of the hydraulic control circuit when a shift is made from the reverse range to the neutral range.
Figure 9:
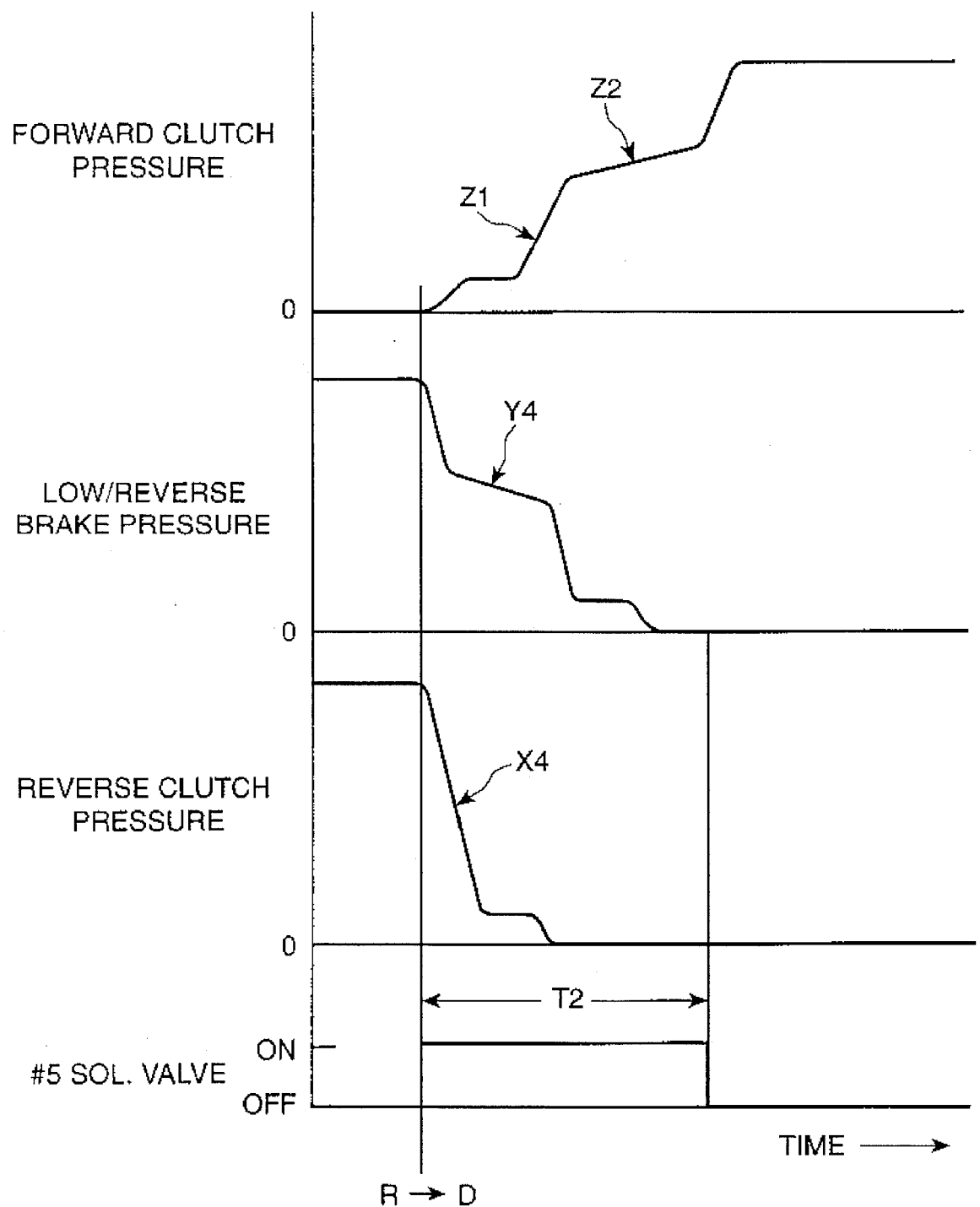
FIG. 9 is a time chart showing changes in control pressure for the reverse-to-drive shift.

In this instance, due to the action of the N/R accumulator 83 during the discharge of the working oil, which has been supplied to the low/reverse brake 46, from the reverse pressure line 112 through the pressure lines 127 and 129, the low/reverse brake pressure lowers with a transitional accompaniment of a gentle incline of shelf pressure as shown by a reference character Y4 in FIG. 9. However, even if the low/reverse brake 46 has been locked when the automatic transmission 10 is placed into the 1st gear, this does not cause any special trouble in the automatic transmission 10. This is because shifting of the automatic transmission 10 into the 1st gear takes place transitionally aiming at applying engine brake. It is of course that during an R-D shift the low/reverse brake pressure line 128 may be brought into communication with the drain port 65c of the third shift valve 65 by forcing the third shift valve 65 to place the spool 65b in the right end position as shown in FIG. 6. In this case, because the low/reverse brake pressure line 128 is disconnected from the N/R accumulator 83, the low/reverse brake pressure lowers quickly without a transitional accompaniment of a gentle incline of shelf pressure immediately after the commencement of the R-D shift.

The controller 200 turns the fifth solenoid valve 97 OFF so as to place the fifth shift valve 96 in its initial state at a lapse of predetermined time T2 after the detection of the R-D shift.

With the automatic transmission control system in accordance with the present invention, because the reverse (R) range is provided by locking of both reverse clutch 44 and low/reverse brake 46, even if the forward clutch 41 is unlocked sluggishly under the action of the N/D accumulator 71 during an R-D shift, the forward clutch 41 is unlocked before the commencement of locking of the reverse clutch 44 due to the difference in flow rate between the pressure lines, preventing the transmission gear mechanism 30 from encountering an inter-lock. In this instance, a switching valve may be disposed in the forward clutch pressure line 116 downstream from the N/D accumulator and adapted to be activated upon a D-R shift so as to force the forward clutch pressure to flow and be discharged bypassing the N/D accumulator 71. Such a configuration makes it reliable to prevent the occurrence of an inter-lock of the transmission gear mechanism 30 during a D-N shift.

As described above, the pressure controlled and generated by the first duty solenoid valve 90 is introduced into and modulated by the modulation valve 93 and then supplied as back pressure into the back pressure chamber 83a of the N/R accumulator 83. This back pressure may be regulated so as to vary the operational characteristic of the N/R accumulator 83, thereby producing shelf pressure different in level between N-R shifts and R-N shifts.

Figure 10:
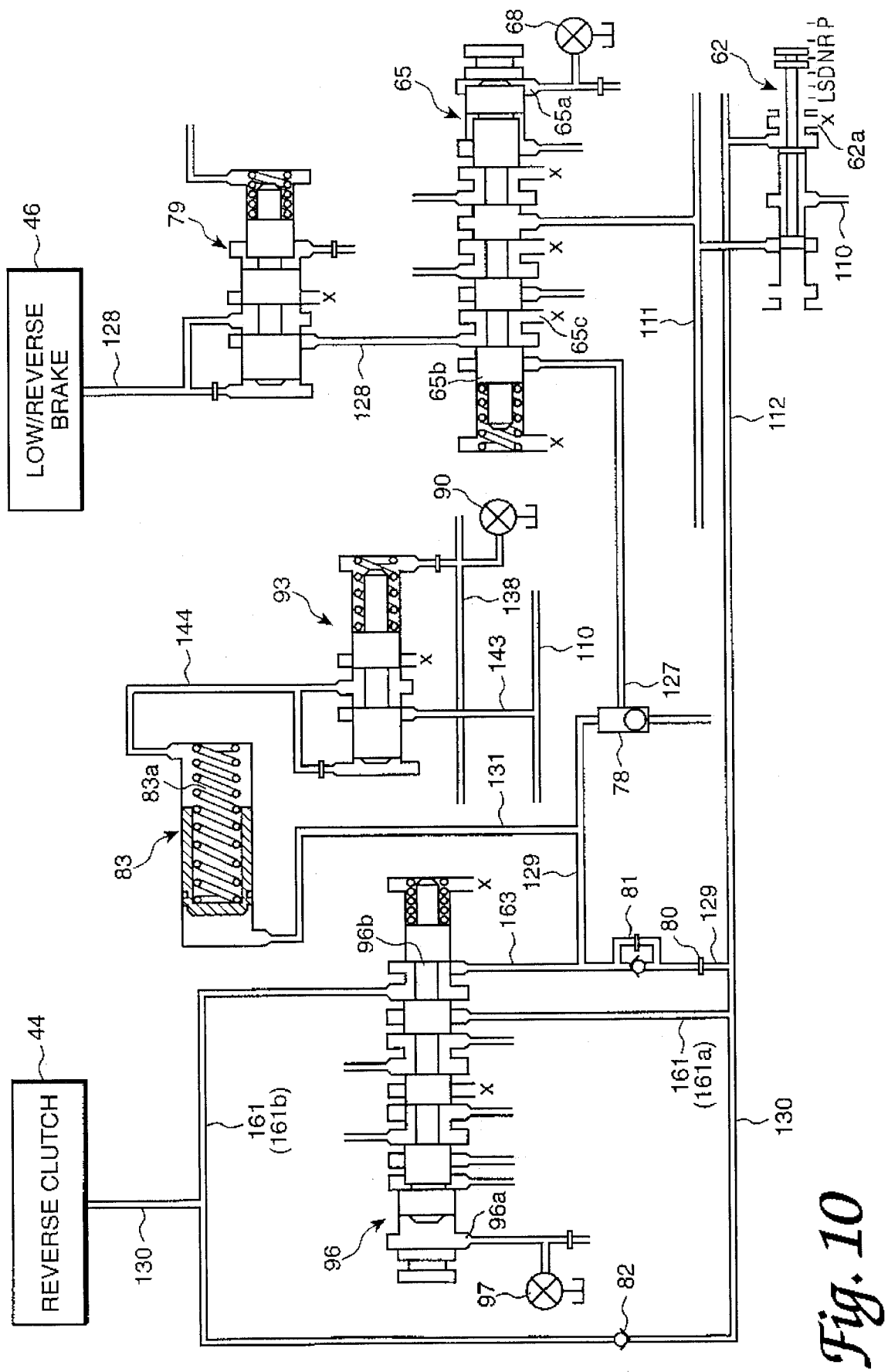
FIG. 10 is an enlarged diagram showing an essential part of a variation of the hydraulic control circuit when a shift is made from the reverse range to the neutral range.

Referring to FIG. 10, a variation of the hydraulic control circuit 60 is shown, in which the operational characteristic of the N/R accumulator 83 is changed so as to produce shelf pressure different in level between unlocking of the reverse clutch 44 during an N-R shift and locking of the low/reverse clutch 46 during an R-N shift. During an R-N shift, the fifth solenoid valve 97 is turned OFF so as to force the fifth shift valve 96 to place the spool 96b into the right end position, causing the working oil being supplied to the reverse clutch 44 to flow into the pressure line 163 through the downstream portion 161b of second bypass pressure line 161 and merge the working oil discharged from the N/R accumulator 83 through the pressure line 131 together. Then, the merged working oil flows through the reverse pressure line 112 via the two-way orifice 80 and is discharged through the range shift valve 62 via the drain port 62a. At this time, the N/R accumulator 83 is supplied with the pressure modulated by the modulation valve 93. This is because there is a requirement that locking pressure needed by the reverse clutch 44 must be relatively higher than that needed by the low/reverse brake 46. For this requirement, the first duty solenoid valve 90 is operated at a duty rate D1 so as to generate controlled pressure which causes the N/R accumulator 83 to develop pressure consistent with shelf pressure for unlocking of the reverse clutch 44. As shown by a reference character X5 in FIG. 11, the N/R accumulator 83 develops shelf pressure with a level risen relatively higher compared with that of the previous embodiment. As a result, unlocking of the reverse clutch 44 is performed while the reverse clutch pressure is lowering by way of the shelf pressure, so that the automatic transmission experiences a reduction in shift shock during an R-N shift.

In this instance, if the N/R accumulator 83 is adapted to have an operational characteristic corresponding to the low/reverse brake pressure required to unlock the low/reverse brake 46, the operation of first duty solenoid valve 90 is suspended during an N-R shift, the N/R accumulator 83 generates the same level of shelf pressure in this case as in the previous embodiment. Further, if the N/R accumulator 83 is not adapted to have an operational characteristic corresponding to the low/reverse brake pressure required to unlock the low/reverse brake 46, the back pressure for the N/R accumulator 83 is regulated so as to correspond to the low/reverse brake pressure required to unlock the low/reverse brake 46.

Figure 12A:
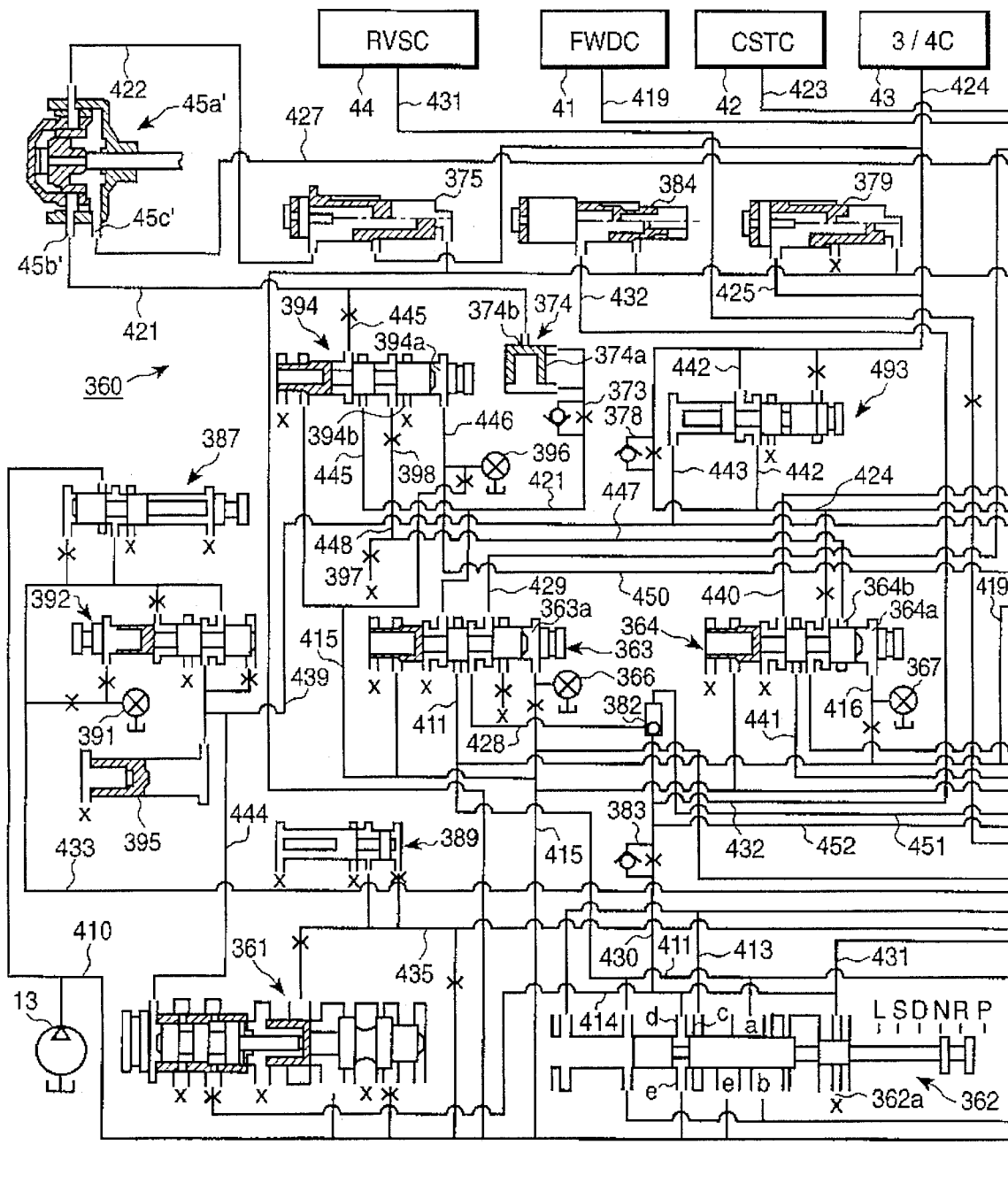
FIG. 12 is a diagram showing a hydraulic control circuit in accordance with another preferred embodiment of the present invention with which the automatic transmission shown in FIG. 1 cooperates.
Figure 12B:
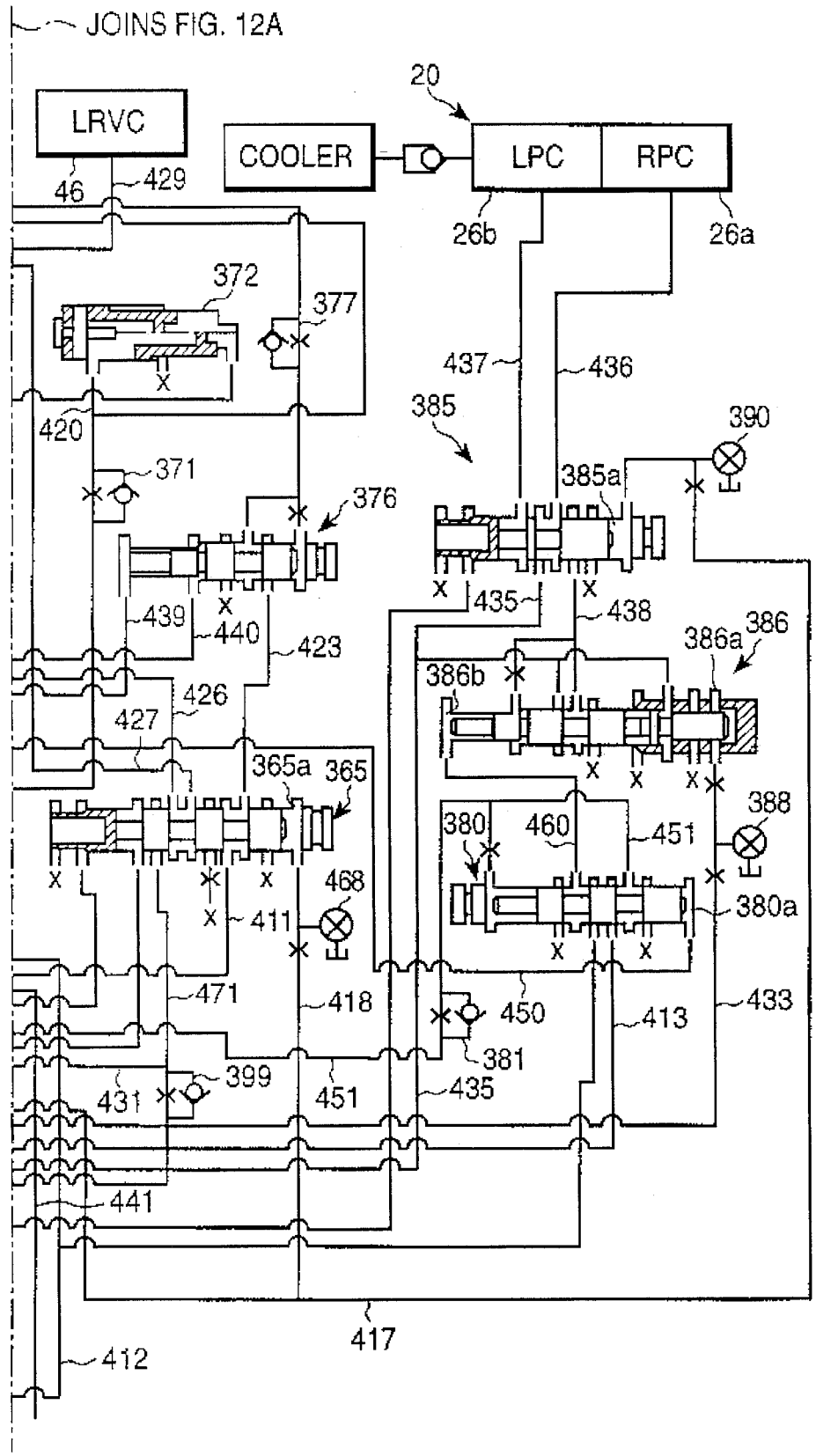

Referring to FIGS. 12 and 13 showing a control system for automatic transmission 10 shown in FIG. 1 in accordance with another preferred embodiment of the present invention, the control system includes the same frictional coupling elements as those shown in FIG. 2 and is, however, configured so as to place the automatic transmission into four forward gears, namely 1st to 4th gears, in the low-speed (L) range. In this control system, the frictional coupling elements, such as clutches and brakes 41–46 and one-way clutches 51 and 52 are selectively activated so as to place the transmission gear mechanism 30 into these four gears in each selected ranges as shown in Table III.

TABLE III

| Range/Gear | FWD | CST | 3/4 | RVS | 2/4 | LRV | FOW | SOW |
|---|---|---|---|---|---|---|---|---|
| Park(P) | | | | | | | | |
| Reverse(R) | | | | o | | o | | |
| Neutral(N) | | | | | | | | |
| Drive | | | | | | | | |
| 1st | o | | | | | | o | o |
| 2nd | o | | | | o | | o | |
| 3rd | o | o | o | | | | o | |
| 4th | o | | o | | o | | | |
| Second | | | | | | | | |
| 1st | o | | | | | | o | o |
| 2nd | o | o | | | o | o | o | |
| 3rd | o | o | o | | | | o | |
| 4th | o | | o | | o | | | |
| Low | | | | | | | | |
| 1st | o | o | | | | o | o | o |
| 2nd | o | o | | o | | o | | |

As shown in FIG. 12, a hydraulic control circuit 360 includes various actuators for activating the frictional coupling elements of the automatic transmission 10. One of the actuator, namely a 2/4 brake actuator 45a' for the 2/4 brake 45 comprises a hydraulically controlled servo piston having a brake apply pressure port (which is referred to as an apply pressure port for simplicity) 45b' and a brake release pressure port (which is referred to as a release pressure port for simplicity) 45c', which may take any type well known to those skilled in the art. The actuator 45a' operates such that it activates to lock the 2/4 brake 45 for brake application under the application of hydraulic pressure to the apply pressure port 45b' only, and to unlock the same for brake release when both apply and release pressure ports 45b' and 45c' are applied with hydraulic pressure, when neither the apply pressure port 45b' nor the release pressure port 45c' is applied with any hydraulic pressure, and when only the release pressure port 45c' is applied with hydraulic pressure. Each of the actuators other than the 2-4 brake actuator 45a' comprises an ordinary hydraulically controlled piston which may also take any type well known to those skilled in the art. The hydraulic control circuit 360 further includes various valves as essential elements, such as a regulator valve 361 for regulating pressure of a working oil discharged into a main pressure line 410 from the oil pump 13 to a certain level of line pressure, a manually operative range shift valve 362 for selectively placing the automatic transmission 10 into any desired ranges, and first-to-second (1-2), second-to-third (2-3) and third-to-fourth (3-4) shift valves 363, 364 and 365 for selectively activating the frictional coupling elements 41–46 according to gear shifts to possible gears.

The range shift valve 362 is manually operated to select three forward ranges, namely the drive (D) range, the second-speed (S) range and the low-speed (L) range, the reverse (R) range depicted in FIG. 12, the neutral (N) range and the park (P) range. The range shift valve 362 is provided with various ports, namely an input pressure port e through which pressure is introduced from a main pressure line 410 and first to fourth output pressure ports a to d to which first to fourth pressure lines 411 to 414 lead, respectively. When the range shift valve 362 selects the various ranges, it brings the input pressure port e into communication with the first and second output pressure ports a to b in the drive (D) and second-speed (S) range, with the first and third output pressure ports a to c in the low-speed (L) range, and with the fourth output pressure port d in the reverse (R) range. Each of the shift valves 363–365 is provided with a return spring (not shown) which displaces a spool to one end in the right hand side position (which is referred to as a right end position) as viewed in FIG. 12. Further, each of the shift valves 363–365 is formed with a control pressure port 363a, 364a or 365a at the one end. When pressure is introduced into the first shift valve 363, 364 or 365 at the control pressure port 63a, the spool is displaced against the spring to another end in the left hand side position (which is referred to as a left end position).

The 1-2 shift valve 63 is in communication at the control pressure port 363a with a first control pressure line 415 branching off from the main pressure line 410. Similarly, the 2-3 shift valve 364 is in communication at the control pressure port 364a with a second control pressure line 416 branching off from the first output pressure line 411. The 3-4 shift valve 365 is in communication at the control pressure port 365a with a third control pressure line 418 leading to the first control pressure line 415 through a pressure line 417. These first to third control pressure lines 415, 416 and 418 are provided with first to third solenoid valve (SLDVs) 366, 367 and 368 which operate such that they cause the 1-2, 2-3 and 3-4 shift valves 363, 364 and 365 to drain control pressure at the control pressure ports 363a, 364a and 365a, respectively, when energized or turned ON so as to displace their spools to one ends in the right hand side positions (which are referred to as right end positions) as viewed in FIG. 12, respectively, and to introduce control pressure at the control pressure port ports 363a, 364a and 365a, respectively, through the control pressure lines 415, 416 and 418, respectively, when deenergized or turned OFF so as to displace the spools to another end in the left hand side positions (which are referred to as left end positions) against springs (not shown), respectively. These first to third solenoid valves 366 to 368, and a lock-up and bypass control solenoid valves 390 and 396 and first and second duty solenoid valves 388 and 391 (which will be described in detail later) are energized or turned ON and deenergized or turned OFF by a controller 500 shown in FIG. 13 in various operative patterns predetermined according to driving conditions.

Referring to FIG. 13, the controller 500 receives various signals, such as a signal from a speed sensor 501 representative of a vehicle speed, a signal from a throttle opening sensor 502 representative of an opening of an engine throttle, a signal from a position sensor 503 representative of a selected range position, a signal from a speed sensor 504 representative of a turbine speed of the torque converter 20, and a signal from a temperature sensor 505 representative of a temperature of the working oil in the hydraulic control circuit 360. These sensors 501–505 are well known in the art and may take any known type. According to these signals indicating driving conditions and driver's demands, the controller 200 controls the solenoid valves 366–368, 390, 396, 388 and 391 so as to activate the shift valves 363–365, thereby selectively locking and unlocking the respective frictional coupling elements 41–46 in the patterns shown in Table III for the respective gears. The operative patterns of the solenoid valves are shown in Table IV.

TABLE IV

| Range | D Range | | | | S Range | | | | L Range | |
|---|---|---|---|---|---|---|---|---|---|---|
| Gear | 1st | 2nd | 3rd | 4th | 1st | 2nd | 3rd | 4th | 1st | 2nd |
| 1st SLDV | OFF | ON | ON | ON | OFF | ON | ON | ON | OFF | ON |
| 2nd SLDV | ON | ON | OFF | OFF | ON | ON | OFF | OFF | ON | ON |
| 3rd SLDV | ON | ON | OFF | ON | ON | OFF | OFF | ON | OFF | OFF |

A pressure line 419, branching off from the first output pressure line 411 which is one of the output pressure lines 411–414 connected to the output pressure ports a to d of the range shift valve 362 and is brought into communication with the main pressure line 410 in the drive (D) range, the second-speed (S) range and the low-speed (L) range, leads as a forward clutch pressure line to the forward clutch 41 via a one-way orifice 371. Accordingly, the forward clutch 41 is locked in any range of these drive (D), second-speed (S) and low-speed (L) ranges. A branch pressure line 420 branching off from the forward clutch pressure line 419 is provided with an accumulator 372 which acts as a buffer during locking of the forward clutch 41. The first output pressure line 411 leads also to the 1-2 shift valve 363 and is brought into communication with a brake apply pressure line 421 when the 1-2 shift valve 363 forces the spool in the right end position upon energization or turning ON of the first solenoid valve 366. Through these pressure lines, brake apply pressure is supplied to the 2/4 brake actuator 45a' at the brake apply pressure port 45b' via a one-way orifice 373 and a pressure release control valve 374, both of which are provided in the brake apply pressure line 421, when the first solenoid valve 366 has been energized or turned ON during the drive (D) range, the second-speed (S) range and the low-speed (L) range, in other words at 2nd, 3rd or 4th gear in the drive (D) range, at 2nd, 3rd or 4th gear in the second-speed (S) range, and at 2nd gear in the low-speed (L) range, and locks the 2/4 brake 45 when the 2/4 brake actuator 45a' is not supplied at the brake release pressure port 45c' with brake release pressure. A pressure line 422, which is provided with an accumulator 372 acting as a buffer during locking of the 2/4 brake 45, leads to the 2/4 brake actuator 45a' at the brake apply pressure port 45b'.

During discharge of the brake apply pressure, the working oil is appropriately restrained and discharged due to cooperative action of the one-way orifice 373 and pressure release control valve 374, so as to cause gentle unlocking of the 2/4 brake 45. Describing in more details, the pressure release control valve 374 has a generally U-shaped valve body 374a slidable up and down as viewed in FIG. 12. This valve body 374a is forced upward by means of a spring (not shown) and is formed at its top wall with an orifice 374b capable of restraining a relatively large amount of working oil. At the commencement of discharge of the brake apply pressure, the valve body 374a of the pressure release control valve 374 is forced downward by means of the discharging brake apply pressure against the spring, so as to bring portions of the brake apply pressure line 421 upstream and downstream from the pressure release control valve 374 into communication with each other, thereby discharging the brake apply pressure quickly. When the brake apply pressure lowers to a predetermined level in balance with the thrust force provided by the spring and its associated elements, the valve body 374a is forced upward by the spring, so as to disconnect the communication between the upstream and downstream portions of the brake apply pressure line 421 from each other. Thereafter, the brake apply pressure is discharged slowly due to the restriction of working oil by means of restraining effect of the orifice 374b.

The 3-4 shift valve 365 to which the first output pressure line 411 leads places its spool in the left end position when the third solenoid valve 368 is deenergized or turned OFF so as to bring the first output pressure line 411 into communication with a coast clutch pressure line 423 leading to the coast clutch 42 via a reducing valve 376 and a one-way orifice 377. The coast clutch 42 is supplied with locking pressure by means of this hydraulic circuit so as to be locked when the third solenoid valve 368 is turned OFF in the drive (D), second-speed (S) and low-speed (L) ranges, namely at the 3rd gear in the drive (D) range, the 2nd or 3rd gear in the second-speed (S) range, and the 1st or 2nd gear in the low-speed (L) range. On the other hand, the second output pressure line 412, which is in communication with the main pressure line 410 in the drive (D) range and the second-speed (S) range, leads to the 2-3 shift valve 364 and is brought into communication with a 3/4 clutch pressure line 424 when the second solenoid valve 367 is turned OFF to force the 2-3 shift valve 364 to place the spool into the left end position. Because the 3/4 clutch pressure line 424 leads to the 3/4 clutch 43 via a one-way orifice 378, the 3/4 clutch is supplied with locking pressure by means of this hydraulic circuit so as to be locked when the second solenoid valve 367 is turned OFF in the drive (D) and second-speed (S) ranges, namely at the 3rd or 4th gear in the drive (D) range, and the 3rd or 4th gear in the second-speed (S) range. In this instance, a pressure line 425 branching off from the 3/4 clutch pressure line 424 is provided with an accumulator 379 acting as a buffer during locking of the 3/4 clutch 43. A pressure line 426 branching off from the 3/4 clutch pressure line 424 leads to the 3-4 shift valve and is brought into communication with a brake release pressure line 427 leading to the 2/4 brake actuator 45a' at the brake release pressure port 45c' when the third solenoid valve 368 is turned OFF to force the 3-4 shift valve 365 to place the spool into the left end position. The 2/4 brake 45 is supplied with release pressure by means of this hydraulic circuit so as to be unlocked when both second and third solenoid valves 367 and 368 are turned OFF in the drive (D) and second-speed (S) ranges, namely at the 3rd gear in the drive (D) range and in the second-speed (S) range.

The third output pressure line 413, which is brought into communication with the main pressure line 410 when the range shift valve 362 selects the low-speed (L) range, leads to the 1-2 shift valve 363 through a pressure line 451, which is connected to the third output pressure line 413 through a reducing valve 380 and provided with a one-way orifice 381, and a pressure line 428 connected to the pressure line 451 through a ball valve 382. This pressure line 428 is brought into communication with a low-reverse brake pressure line 429 leading to the low-reverse brake 46 when the first solenoid valve 366 is turned OFF to force the 1-2 shift valve 363 to place the spool into the left end position. The low/reverse brake 46 is supplied with locking pressure by means of this hydraulic circuit so as to be locked when the first solenoid valve 366 is turned OFF in the low-speed (L) range, namely at the 1st gear in the low-speed (L) range.

The fourth output pressure line 414, which is brought into communication with the main pressure line 410 when the range shift valve 362 selects the reverse (R) range, leads to the 1-2 shift valve 363 through a pressure line 430 branching off from the fourth output pressure line 414 and provided with a one-way orifice 383, and the pressure line 428 connected to the pressure line 430 through the ball valve 382. This fourth output pressure line 414 is brought into communication with the low-reverse brake pressure line 429 when the first solenoid valve 366 is turned OFF to force the 1-2 shift valve 363 to place the spool into the left end position. The fourth output pressure line 414 leads as a reverse clutch pressure line 431 to the reverse clutch 44 via a one-way orifice 399. Accordingly, in the reverse (R) range, while the low/reverse brake 46 is locked when the first solenoid valve 366 is deenergized or turned OFF, the reverse clutch 44 is held locked.

An accumulator pressure line 432 and a first bypass pressure line 452, branching off from the pressure line 430 between the one-way orifice 383 and ball valve 382, lead to an accumulator 384 acting as a buffer during locking of the low-reverse brake 46 and the 3-4 shift valve 365, respectively. Further, a second bypass pressure line 471, branching off from the reverse clutch pressure line 431 between the one-way orifice 399 and reverse clutch 44, leads to the 3-4 shift valve 365. Thus, the 3-4 shift valve 365 brings the first bypass pressure line 452 in communication with the second bypass pressure line 471 when the third solenoid valve 368 is energized or turned ON, and disconnects the communication between them when the third solenoid valve 368 is deenergized or turned OFF. Accordingly, as will be described in detail later, the working oil is enabled to flow bypassing the one-way orifices 383 and 399 which restrain working oil in opposite directions to each other, so as to be supplied to and discharged from the reverse clutch 44 and low-reverse brake 46 at a desired high speed.

The hydraulic control circuit 360 is further provided with a shift valve 385 for activating the lock-up clutch 26 in the torque converter 20 and a lock-up control valve 386 for regulating pressure to be supplied to the torque converter 20 through the shift valve 385. The lock-up control valve 386 is connected at its control port 386a to a control pressure line 433 to which the main pressure line 410 leads via a reducing solenoid valve 387 and in which the first duty solenoid valve 388 is disposed. The shift valve 385 is connected to a pressure line 435 leading from the regulator valve 361 via a relief valve 389 and is connected at its control port 385a to a control pressure line 417 in which the lock-up solenoid valve 390 is provided and which leads to the main pressure line 410 through a first control pressure line 415. When the lock-up solenoid valve 390 is deenergized or turned OFF, the shift valve 385 brings the pressure line 435 in communication with a release pressure line 436 leading to the release pressure chamber (RPC) 26b, so as to release completely the lock-up clutch 26. On the other hand, when the lock-up solenoid valve 390 is energized or turned ON, the shift valve 385 brings the pressure line 435 in communication with a lock-up pressure line 437 leading to the lock-up pressure chamber (LPC) 26a and, on the other hand, brings the release pressure line 436 into communication with the lock-up control valve 386 through a pressure line 438. The first duty solenoid valve 388 is activated so as to regulate the control pressure introduced into the lock-up control valve 386 through the control port 386a from the control pressure line 433, thereby performing control of the pressure difference between the locking pressure introduced into the lock-up pressure chamber (LPC) 26a through the lock-up pressure line 437 and the release pressure introduced into the release pressure chamber (RPC) 26b through the release pressure line 436. In this manner, the lock-up clutch 26 is completely locked or otherwise locked so as to allow a predetermined amount of slippage.

The lock-up control valve 386 is connected at its another control port 386b provided at the opposite end to the control port 386a to a pressure line 460 leading from the reducing valve 380 disposed in the third output pressure line 413. In addition, the reducing valve 380 is connected at its control port 380a provided its one end to a pressure line 450 branching off from a pressure line 446 leading to a control port 394a of a timing valve 394 which will be described later.

The reducing valve 376, leading to the coast clutch 42, is supplied with pressure as coast clutch pressure in the coast clutch pressure line 423 downstream the reducing valve 376. On the other hand, the second duty solenoid valve 391 causes a modulation valve 392 so as to modulate the line pressure in accordance with engine loads and deliver the modulated pressure to the regulation valve 361. The modulation valve 392 deliver the modulated pressure also to the reducing valve 376 through a pressure line 439. A pressure line 440 connected to the middle portion of reducing valve 376 leads to the 2-3 shift valve 364 and is brought into communication with a pressure line 441 leading from the main pressure line 440 when the second solenoid valve 367 is energized or turned ON so as to force the 2-3 shift valve 364 to place the spool into the right end position. Thus, the line pressure acts on the spool of the reducing valve 376 as well as the modulated pressure so as to displace the spool toward the right end position. Accordingly, the coast clutch pressure is increased at the 2nd gear in the low-speed (L) range in which the second solenoid valve 367 is energized or turned ON, so that the coast clutch 42 bears an increased torque. On the other hand, when the second solenoid valve 367 is deenergized or turned OFF, the 2-3 shift valve 364 is forced to place the spool into the left end position, disconnecting the communication between the pressure line 441 and the main pressure line 440. As a result, an increase in the coast clutch pressure is suppressed at the 3rd gear in the drive (D) and second-speed (S) ranges in which the second solenoid valve 367 is deenergized or turned OFF, so that the coast clutch 42 bears a decreased torque.

In addition to the above described control elements, the hydraulic control circuit 360 is provided with a 2-3 bypass valve 493 and a timing valve 394 for regulating a timing at which pressure is supplied to and released from the 3/4 clutch 43. This 2-3 bypass valve 493 is disposed in a bypass pressure line 442 bypassing the one-way orifice 378 in the 3/4 clutch pressure line 424 and is supplied at one end with the 3/4 clutch pressure in the 3/4 clutch pressure line 424 downstream from the one-way orifice 378. The bypass valve 493 is further supplied at another end with the modulated pressure generated by the modulation valve 392 through a pressure line 443 branching off from the pressure line 439. When the 3/4 clutch pressure increases above a predetermined level and forces the 3/4 clutch 43 to displace the spool into the left end position, the 2-3 bypass valve 493 shuts the bypass pressure line 442. Accordingly, the 3/4 clutch pressure is supplied to the 3/4 clutch 43 quickly at the beginning of pressure supply passing through the bypass pressure line 442 and slowly thereafter passing through the one-way orifice 378. In such a manner, the timing at which the 3/4 clutch is locked during a second-to-third (2-3) shift-up is appropriately regulated and is varied according to openings of an engine throttle valve. In this instance, a pressure line 444 through which the modulated pressure is supplied to the regulator valve 361 is provided with an accumulator 395 acting as a buffer during supplying of the modulated pressure. The timing valve 394 is disposed in a bypass pressure line 445 bypassing the one-way orifice 373 in the brake apply pressure line 421 leading from the 1-2 shift valve 363 and the pressure release control valve 374. This timing valve 394 is connected at its control port 394a provided at one end to a control pressure line 446 which branches off from the first control pressure line 415 leading to the main pressure line 410 and is provided with the bypass control solenoid valve 396. The reducing valve 380 is connected at the control port 380a to the pressure line 450 branching off from the control pressure line 446 downstream from the bypass control solenoid valve 396.

The 2-3 shift valve 364 has a drain port 346b which is brought into communication with the 3/4 clutch pressure line 424 when the spool is displaced to the right end position and is connected to a first drain pressure line 447 provided with a first orifice 397. A second drain pressure line 448, branching off from the first drain pressure line 447 upstream from the first orifice 397, leads to the timing valve 394 via a second orifice 398 and is brought into communication with a drain port 394b of the timing valve 394 when the timing valve 394 displaces the spool into the right end position. In other words, when the second solenoid valve 367 is energized or turned ON so as to cause the 2-3 shift valve 364 to displace the spool into the right end position, the 3/4 clutch pressure line 424 leading to the 3/4 clutch 43 is brought into communication with the first drain pressure line 447, so that the 3/4 clutch pressure is discharged slowly in the first drain pressure line 447 due to the restraining effect of the first orifice 397. Under this condition, when the bypass control solenoid valve 396 is energized or turned ON so as to force the timing valve 394 to displace the spool into the right end position, the first drain pressure line 447 is brought into communication with the drain port 394b of the timing valve 394 through the second drain pressure line 448, so that the 3/4 clutch pressure is discharged quickly.

Because the pressure line 450, which branches off from the pressure line 446 leading to the timing valve 394, is connected to the control port 380a of the reducing valve 380, when the bypass control solenoid valve 396 is deenergized or turned OFF, the line pressure from the first control pressure line 415 is introduced into the control port 380a of the reducing valve 380 through the pressure line 450. At this time, since the line pressure has been regulated as a control pressure by the regulation valve 361, it is variably regulated according to vehicle speeds or throttle openings. Accordingly, because of duty control of the reducing valve 380, the reducing valve 380 performs switching of the introduction of pressure into the lock-up control valve 386 through the pressure line 460 and the regulation of pressure supplied to the low/reverse brake 46 through the pressure line 451 and low/reverse brake pressure line 429 via the ball valve 383 and 1-2 shift valve 363.

Figure 14:
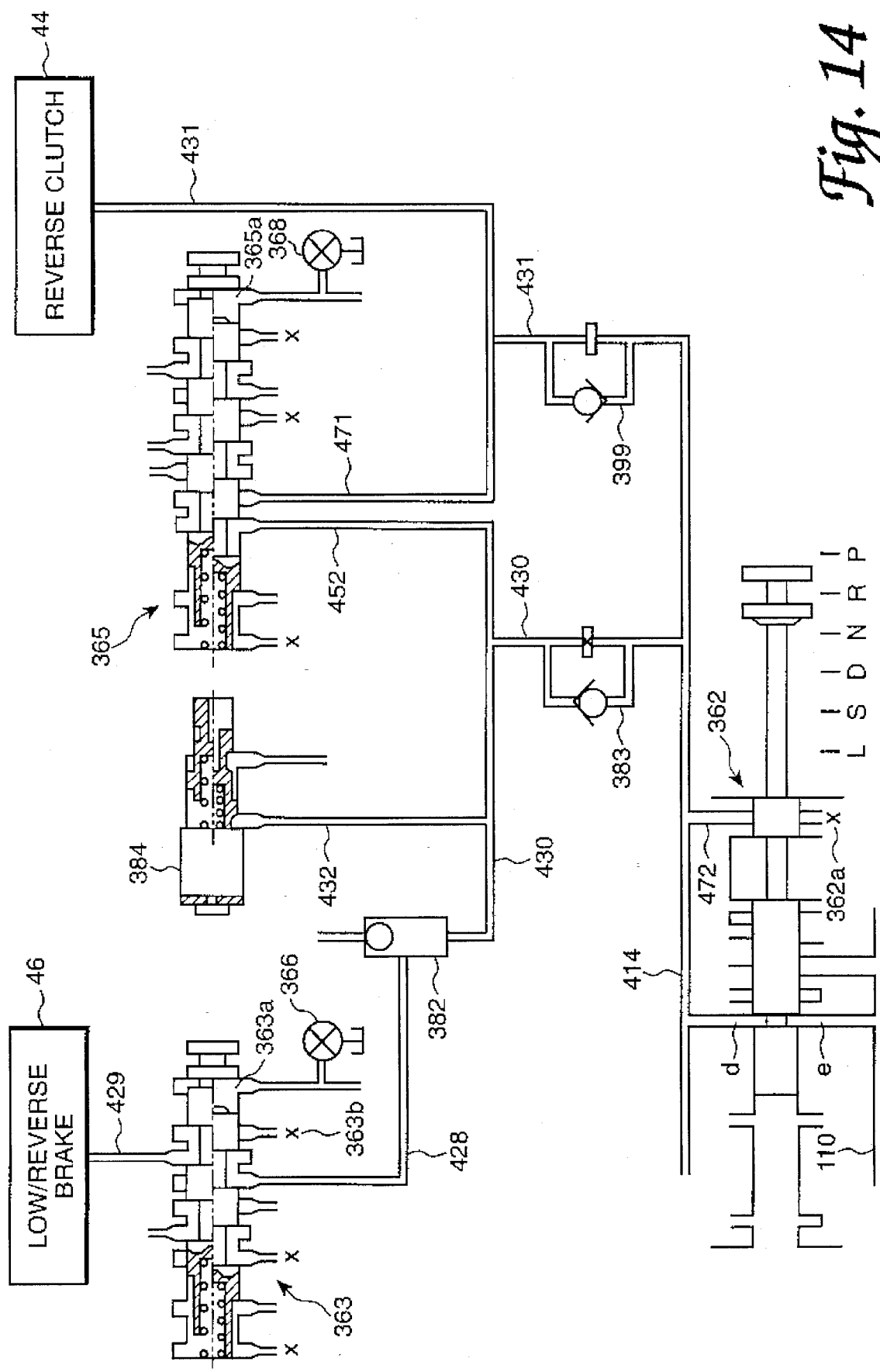
FIG. 14 is an enlarged diagram showing an essential part of the hydraulic control circuit operated for the reverse range.

Referring to FIG. 14 showing the essential part of the hydraulic control circuit 360 when the range shift valve 362 selects the reverse (R) range, the range shift valve 362 brings the input pressure port e into communication with the output pressure port d, introducing the line pressure regulated by the regulation valve 361 into the fourth output pressure line 414 through the main pressure line 410. As was previously described, the fourth output pressure line 414 branches off into the pressure line 430 and the reverse clutch pressure line 431. The pressure line 430 leads to the pressure line 428 via the first one-way orifice 383 for allowing the working oil to flow in the direction of discharge and the ball valve 382, and is brought into communication with the low/reverse brake pressure line 429 leading to the low/reverse brake 46 when the first solenoid valve 366 is deenergized or turned OFF. In this instance, the first bypass pressure line 452 and accumulator pressure line 432 branch off from the pressure line 430 between the first one-way orifice 383 and ball valve 382 and lead to the 3-4 shift valve 365 and the accumulator 384, respectively. Further, the reverse clutch pressure line 431 leads to the reverse clutch 44 via the second one-way orifice 399 for allowing the working oil to flow in the direction of supply. In this instance, the second bypass pressure line 471 branches off from the reverse clutch pressure line 431 between the reverse clutch 44 and second one-way orifice 399.

During an N-R shift, the first and third solenoid valves 366 and 368 are deenergized or turned OFF at the beginning of shift, the 1-2 and 3-4 shift valves 363 and 365 are supplied with control pressure at their control ports 363a and 365a, respectively, so as to displace their spools into the left end positions shown by lower halves of the spools in FIG. 14. At a time t1 the range shift valve 362 completes the N-R shift, the line pressure is introduced into the fourth output pressure line 414. Due to the opposite directions of pressure restraint of the first and second one-way orifices 383 and 399, almost all part of the introduced line pressure flows in the reverse clutch pressure line 431 with the second one-way orifice 399 which allows pressure to flow in the direction of supply toward the reverse clutch 44. In addition, the 3-4 shift valve 365 closes the second bypass pressure line 471. For these reasons, the line pressure is supplied as reverse clutch pressure quickly to the reverse clutch 44 through the pressure line 431, so as to rise quickly to a level Pc necessary to lock the reverse clutch 44. The reverse clutch 44 is locked as soon as the reverse clutch pressure reaches the locking level Pc at a time t2. Because the low/reverse brake 46 has not yet been locked at the time t2, the automatic transmission 10 does not causes shift shocks even when the reverse clutch is locked.

Figure 15:
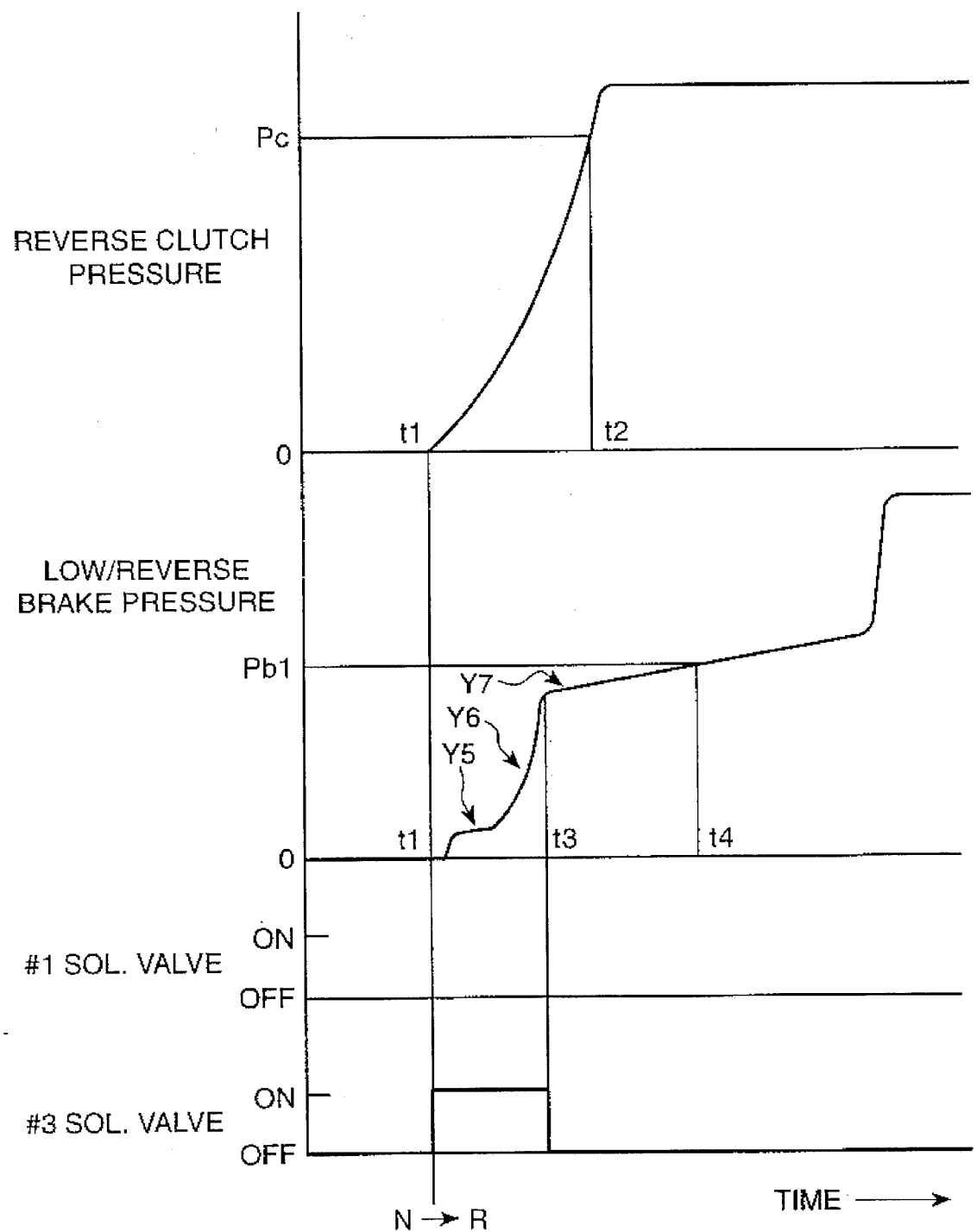
FIG. 15 is a time chart showing changes in hydraulic pressure during a neutral-to-reverse shift.

When the third solenoid valve 368 is turned ON to force the 3-4 shift valve 365 to displace the spool toward the right end position at the time t1, it brings the first bypass pressure line 452 in communication with the second bypass pressure line 471, allowing the line pressure passed through the second one-way orifice 399 to flow partly into the reverse clutch pressure line 431 leading to the reverse clutch 44 and partly into the second bypass pressure line 471 and then the pressure line 430 through the first bypass pressure line 452. As a result, the low/reverse brake pressure rises quickly as shown by reference characters Y5 and Y6 in FIG. 15, so as to suppress the delay of locking of the low/reverse brake 46, thereby improving the responsiveness of the hydraulic circuit. At the displacement of the spool of the 3-4 shift valve 365, the low/reverse clutch pressure rises slowly as shown by a reference character Y5. Thereafter, the low/reverse clutch pressure continues to rise. At a time t3 before the low/reverse clutch pressure reaches a level Pb1 at which the low/reverse clutch 46 is locked, the third solenoid valve 368 is turned OFF. This causes the 3-4 shift valve 365 to displace the spool toward the right end position, so as to disconnect the communication between the first and second bypass pressure lines 452 and 471 from each other, forcing the line pressure to pass through the first one-way orifice 383. As a result, due not only to the restraining effect of the first one-way orifice 383 but also to the buffer effect of the accumulator 384, the low/reverse brake pressure rises slowly as shown by a reference character Y7 and reaches the level Pb1 at a time t4 after the time t2 at which the reverse clutch 44 is locked. Accordingly, due to the slow completion of locking of the low/reverse brake 46 after the locking of the reverse clutch 44, the automatic transmission 10 causes less shift shocks during locking of the low/reverse brake 46. In this instance, the times t1 and t3 the third solenoid valve 368 is turned ON and OFF, respectively, are experimentally established according to elementary characteristics of the hydraulic circuit 360 as so as to delay locking of the low/reverse brake 46 from locking of the reverse clutch 44.

Figure 16:
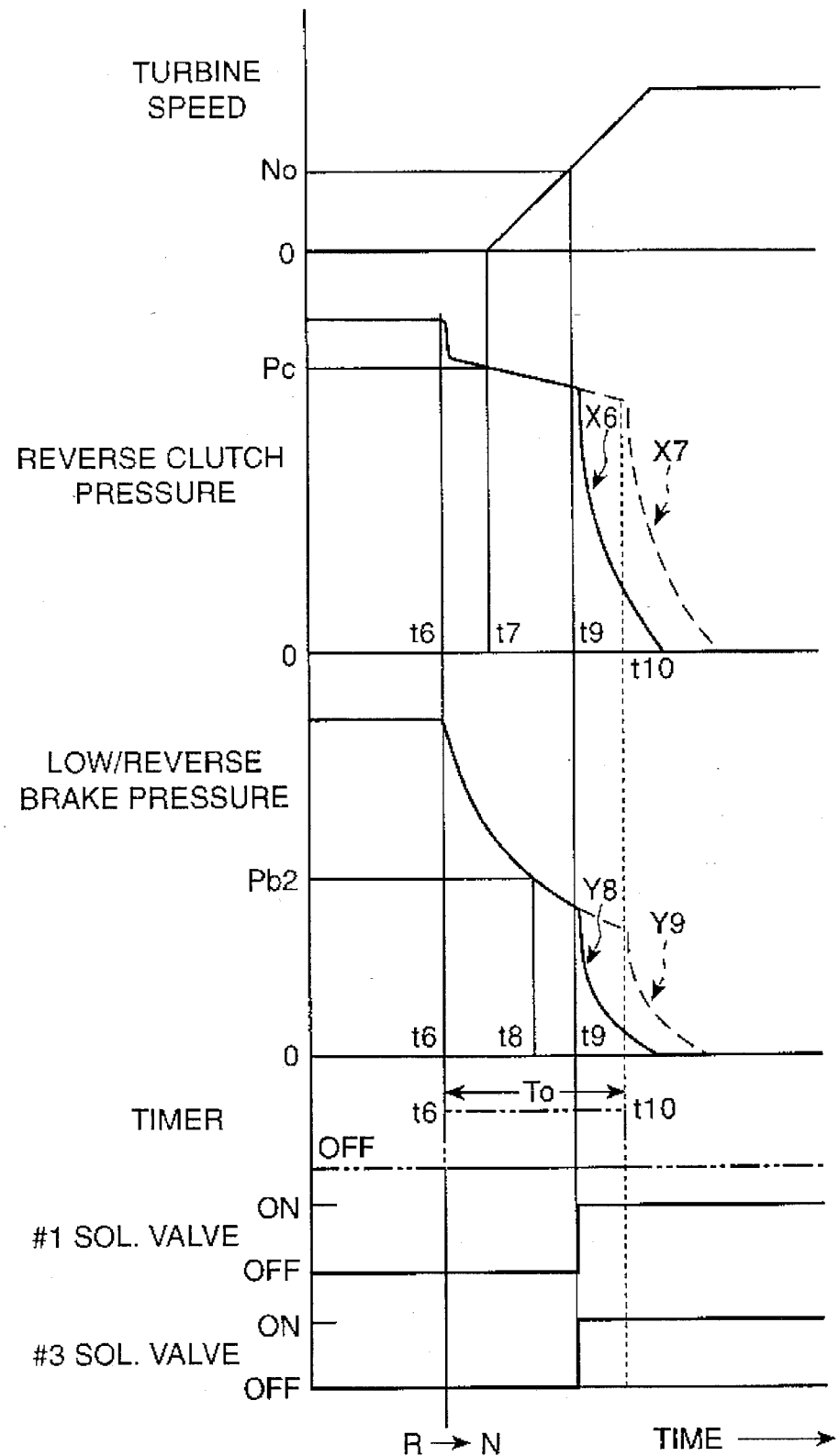
FIG. 16 is a time chart showing changes in control pressure for a reverse-to-neutral shift.

During an R-N shift, both first and third solenoid valves 366 and 368 are turned OFF, forcing the 1-2 shift valve 363 and 3-4 shift valve 365 to place their spools in the left end positions. As shown in FIG. 16, when the range shift valve 362 is shifted from the reverse (R) range to the neutral (N) range at a time t5, it disconnects the communication between the input and output pressure ports e and d so as to stop the supply of pressure to the fourth output pressure line 414 and, on the other hand, brings a drain pressure line 472 branching off from the fourth output pressure line 414 into communication with the drain port 362a. As a result, since the reverse clutch pressure line 431 is not provided with any accumulator, the reverse clutch pressure is immediately discharged through the drain port 362a. However, at this time, since the communication between the first and second bypass pressure lines 452 and 471 has been disconnected, the pressure passes through the second one-way orifice 399 which allows pressure to flow in the direction of discharge. Accordingly, the pressure is transmitted at a low speed due to the restraining effect of the second one-way orifice 399, the pressure is slowly discharged through the drain port 362a through the drain pressure line 472.

In this event, because the reverse clutch pressure is discharged immediately after the shift of the range shift valve 362 to the neutral (N) range and because the reverse clutch 44 needs the level of locking pressure Pc higher than that of the low/reverse brake 46, the reverse clutch 44 is released or unlocked prior to the low/reverse brake 46. However, because of slow discharge of the reverse clutch pressure due to the restraining effect of the second one-way orifice 399, the reverse clutch pressure drops slowly to the locking level Pc. After a time t7 the reverse clutch pressure has reached the locking level Pc, the reverse clutch 44 is unlocked gradually, so as to provide the automatic transmission 10 with a considerable decrease in shift shock during unlocking of the reverse clutch 44. Further, because of the provision of the dish plate in the reverse clutch, the automatic transmission 10 experiences less shift shocks during unlocking of the reverse clutch 44.

On the other hand, because the first one-way orifice 383 has no restraining effect in the direction of discharge, the low/reverse brake pressure passes through the first one-way orifice 383 quickly and is discharged from the drain port 362a through the fourth output pressure line 414 and drain pressure line 472. Simultaneously, the accumulated pressure in the accumulator 384 is discharged from the drain port 362a after passing through the accumulator pressure line 432, pressure line 430, first one-way orifice 383 and fourth output pressure line 414. Accordingly, the low/reverse clutch pressure drops relatively quickly in comparison with the reverse clutch pressure. Nevertheless, as was described previously, because the level of pressure Pb2 at which the low/reverse brake 46 starts to be unlocked is lower than the locking level Pc at which the reverse brake 44 starts to be locked and a time t8 the low/reverse brake pressure reaches the unlocking level Pb2 is later than a time t7 the reverse clutch pressure reaches the locking level Pc, unlocking of the low/reverse brake 46 is caused after unlocking of the reverse clutch 44. This provides a suppression of shift shocks due to unlocking of the low/reverse brake 46. After the time t8, unlocking of both reverse clutch 44 and low/reverse brake 46 progresses coincidently.

In some cases, a range shift is made to forward ranges, such as the drive (D) range, immediately after an R-N shift. In such a case, because a frictional coupling elements, such as the forward clutch, is locked, it is necessary to unlock completely the reverse clutch 44 early in order to avoid a happening of so-called inter-lock of the transmission mechanism 30 and increase the reliability of the hydraulic circuit 360. For this reason, control of the pressure in connection with and after unlocking of the reverse clutch 44 and low/reverse brake 46 is made by discharging the pressure remaining in the hydraulic circuit relating these clutch and brake quickly. This quick discharge of pressure is performed by switching over of the first and third solenoid valves 366 and 368 based on the rotational speed of the turbine 23 of the torque converter 20.

Specifically, unlocking of the reverse clutch 44 provides an increase in the rotational speed of the turbine 23 of the torque converter 20 which is detected by the speed sensor 504. As shown in FIG. 16, for instance, the turbine speed Nt is zero (0) when the automatic transmission 10 is in the reverse (R) range and the reverse clutch 44 has been locked. The turbine 23 increase its rotational speed Nt simultaneously with the commencement of unlocking of the reverse clutch 44 at the time t7 the reverse clutch pressure has reached below the locking level Pc. At a time t9 the turbine 23 reaches a predetermined critical speed No, for instance 300 rpm., both first and third solenoid valves 366 and 368 are turned OFF so as to displace their spools into the right end positions. That is, the timing at which the first and third solenoid valves 366 and 368 are operated is determined depending upon the predetermined critical speed No The predetermined critical speed No is experimentally established based on the relationship between turbine speeds Nt and the degree of unlocking of the reverse clutch 44 in consideration of various factors, such as a pressure needed to unlock the reverse clutch 44, the temperature of working oil, openings of the engine throttle.

Turning ON of the third solenoid valve 368 causes the 3-4 shift valve 365 to provide the communication between the first and second bypass pressure lines 452 and 471, allowing the reverse clutch pressure to flow into the drain pressure line 472 through the second bypass pressure line 452 via the first one-way orifice 383 from the second bypass pressure line 471 and to be discharged from the drain port 362a of the range shift valve 362 quickly as shown by a reference character X6 in FIG. 16. Accordingly the reverse clutch pressure drops quickly, so as to prevent an inter-lock between the forward clutch 41 and reverse clutch 44 even when a shift to the drive (D) range takes place immediately after a shift to the neutral (N) range. On the other hand, when the first solenoid valve 366 is turned ON, the 1-2 shift valve 363 disconnects the communication between the low/reverse brake pressure line 429 and pressure line 428 and coincidently brings the low/reverse brake pressure line 429 in communication with the drain port 363b thereof. This causes the low/reverse brake pressure, which was being discharged from the drain port 363a along with the pressure remaining in the accumulator 384, is discharged alone from the drain port 363b. As a result, the low/reverse brake pressure drops quickly as shown by a reference character Y8 in FIG. 16. At this time, the pressure in the accumulator 384 is continuously discharged quickly from the drain port 363a via the first one-way orifice 383. In other words, because turning ON of the first solenoid valve 366 makes an additional drain port available, the pressure remaining still after the unlocking of a frictional coupling element is quickly discharged, so as to have the hydraulic circuit ready for another operation promptly. This leads to the prevention of inter-locks between the forward clutch 41 and reverse clutch 44 and the improvement of responsiveness and reliability of the hydraulic circuit 360.

The timing control of the first and third solenoid valves 366 and 368 may be performed, in place of the basis of the rotational speed Nt of the turbine 23, in such manner that the first and third solenoid valves 366 and 368 are turned ON in spite of rotational speeds of the turbine 23 at a lapse of a specific time To after the commencement of an R-N shift. The specific time To is experimentally established based on the fluidity of working oil under severe cold weathers e.g. at a temperature of 30 degrees below freezing point, the configuration of the hydraulic circuit, and a desired temperature of working oil, etc.

Specifically, as shown by a double-dotted line in FIG. 16, a timer is started at a time t9 the range shift valve 362 is shifted from the reverse (R) range to the neutral (N) range at a time t6. After a lapse of the specific time To, both first and third solenoid valves 366 and 368 are turned ON at a time t10. This causes both reverse clutch pressure and low/reverse brake pressure drop quickly as shown by reference characters X7 and Y9, respectively, due to the change of the pressure lines as was previously described. Accordingly, even if the reverse clutch pressure and low/reverse brake pressure drop slowly due to a delay of discharging of these pressure during cold operations, these pressure are discharged quickly after a lapse of the specific time To from the occurrence of an R-N shift, so that the reverse clutch 44 and low/reverse brake 46 return to their initial conditions and get ready for another operation promptly. With this control system, even if a time necessary for the turbine 23 to reach the predetermined critical speed No is prolonged due to a delay of unlocking of the frictional coupling elements, quick unlocking of the frictional coupling elements is realized even under severe cold weather, providing an improved responsiveness of the hydraulic circuit and ensuring a comfortable feeling of shift.

In an attempt to avoid so-called N-D shift shocks which are generally caused when shifts to forward ranges, such as the drive (D) range, from the neutral (N) range, an interim operative pattern of the solenoid valves is provided to lock specific frictional coupling elements, which are to be locked for high speed gears, at the end of an R-N shift. Because when a shift is made from the neutral (N) range in which all of the frictional coupling elements have been unlocked to the 1st gear for which the specific frictional coupling elements are locked, the engine output torque is multiplied with a large ratio corresponding to a reduction ratio of the transmission mechanism 30 placed at the 1st gear and transmitted to drive wheels, the transmission 10 causes shift shocks in excess and makes the driver feel discomfort. For this reason, before causing the solenoid valves to take the interim operative pattern for the 1st gear, the solenoid valves are required to take the interim operative pattern for the 1st gear which has a relatively low reduction ratio.

Figure 17:
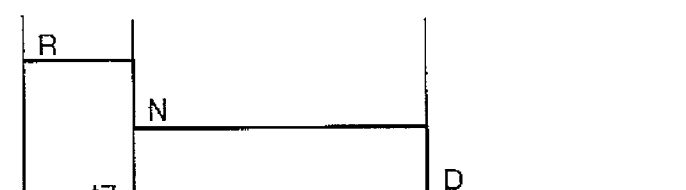
FIG. 17 is a time chart showing changes in control pressure for the reverse-to-drive shift.
Figure 18:
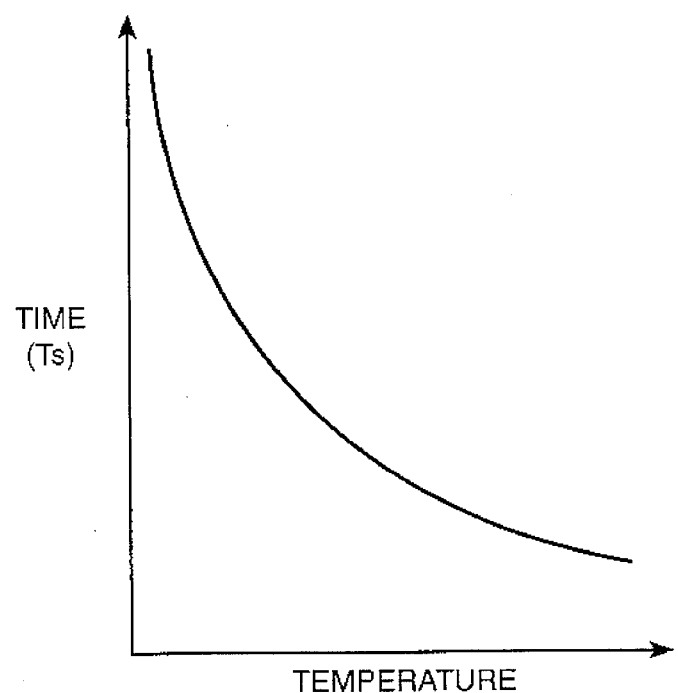
FIG. 18 is a diagram showing a time setting map relating to the temperature of working oil.

Specifically, as shown in FIG. 17, at the time t9 the turbine 23 reaches slightly above the predetermined critical speed No, or otherwise at the time t10 the timer starts, after the commencement of an R-N shift at the time t6, the first and third solenoid valves 366 and 368 are turned ON from OFF so as to discharge the remaining pressure quickly. This operative pattern, in which the first, second and third solenoids 366, 367 and 368 are, respectively, turned ON, OFF and ON, is refereed to as a 1st interim operative pattern (1st IOP). Simultaneously with the turning ON of the first and third solenoid valves 366 and 368 either at the time t9 or at the time t10, a shift timer starts to count a specific time Ts. As apparent from a map of time Ts relating to the temperature of working oil shown in FIG. 18, this specific time Ts is attained larger as the temperature of working oil detected by the temperature sensor 505 decreases. Thereafter, at a time t11 after a lapse of the specific time Ts, only the first solenoid valve 366 is turned OFF, then, the first to third solenoid valves 366–368 take a 2nd interim operative pattern (2nd IOP). The 2nd interim operate pattern of the first to third solenoid valves 366–368 is identical with the operative pattern for locking both forward clutch 41 and 3/4 clutch 43. At the end of an R-N shift, the first to third solenoids 336–338 hold the 2nd interim operative pattern.

When a shift is made to the drive (D) range, the line pressure is introduced into the first and second output pressure lines 411 and 412 via the output pressure ports a and b of the range shift valve 362, respectively. At this time, since the first to third solenoid valves 336–338 are held in the 2nd interim operative pattern, the line pressure introduced via the output pressure port a flows into the forward clutch pressure line 419 branching off from the first output pressure line 411 via the one-way orifice 371 and is introduced into the forward clutch 41. Because the one-way orifice 371 has the restraining effect in the direction of supply, the forward clutch 41 is gradually locked. On the other hand, the line pressure introduced via the output pressure port b flows into the 3/4 clutch pressure line 424 through the second output pressure line 412 via the 2-3 shift valve 364 and is introduced into the 3/4 clutch 43. At this time, because the 2-3 bypass valve 493 is disposed in the bypass pressure line 442 bypassing the one-way orifice 378 in the 3/4 clutch pressure line 424 and is supplied with modulated pressure produced by the modulation valve 392 through the pressure line 443 branching off from the pressure line 439, it brings the upstream and downstream portions of the bypass pressure line 442 into communication with each other. The communication of the bypass pressure line 442 enables the 3/4 clutch pressure to be supplied quickly into the 3/4 clutch 43.

When a shift is made to the drive (D) range while the first to third solenoid valves 366–368 take the 2nd interim operative pattern, the 3/4 clutch 43 for high gears is locked prior to locking of the forward clutch 41, so that the engine output torque is not multiplied with large ratios, thereby preventing the occurrence of so-called N-D shift shocks which is generally caused by locking of the forward clutch 41 during a shift to forward gears immediately after a shift to the neutral (N) range in which all of the frictional coupling elements have been unlocked. Then, at a time the 3-4 clutch 43 and forward clutch 41 are locked, the first to third solenoid valves 366–368 take the 3rd interim operative pattern (3rd IOP) so as to unlock the 3/4 clutch 43 leaving the forward clutch 41, thereby ending the N-D shift with the 1st gear in the drive (D) range.

With the automatic transmission control system of this invention, shift shocks are effectively prevented during an N-R shift taking place immediately after an R-N shift. Because the accumulator 384 is held in communication with the first one-way orifice 383 having the restraining effect in the direction of discharge and is always under the restraining effect of the first one-way orifice 383, the discharge of pressure remaining in the accumulator 384 is always made quickly. When another N-R shift is made, the accumulator 384 has restored its function as a buffer and been ready for pressure accumulation. As a result, during an N-R shift, the pressure introduced into the pressure line 430 through the first one-way orifice 383 is accumulated in the accumulator 384, so as to produce the shelf pressure in the low reverse brake pressure which provides gradual locking of the low/ reverse brake 46 for the N-R shift without accompanying shift shocks.

Whereas the description has been directed by way of example to the automatic transmission having a single frictional coupling element for providing a reverse gear, nevertheless, the automatic transmission may have more than one frictional coupling elements used to provide the reverse gear.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An automatic transmission control system for selectively locking and unlocking a plurality of frictional coupling elements provided within an automatic transmission with hydraulic pressure so as to place the automatic transmission into any desired combination of gears, said automatic transmission control system comprising:

range shift means for manually shifting said automatic transmission into a plurality of ranges including a reverse range, a neutral range and a forward range, said range shift means discharging hydraulic pressure from a specific one of said frictional coupling elements to unlock said specific one of said frictional coupling elements during a reverse related shift to said forward range from said reverse range or vice versa; and pressure discharge rate regulating means for regulating a discharge rate of said hydraulic pressure so that said discharge rate is larger for said reverse related shift than for a shift from one of said reverse range and said forward range to said neutral range.

2. An automatic transmission control system as defined in claim 1, wherein said pressure discharge rate regulating means comprises of orifice variable in opening size.

3. An automatic transmission control system as defined in claim 1, wherein said pressure discharge rate regulating means comprises a solenoid valve.

4. An automatic transmission control system for selectively locking and unlocking a plurality of frictional coupling elements, including a reverse brake and reverse clutch, provided within an automatic transmission with hydraulic pressure so as to place the automatic transmission into any desired combination of gears, said automatic transmission control system comprising:

manually operated range shift means for selecting a plurality of ranges including a reverse range, a neutral range and a forward range, said reverse range being provided by locking both said reverse clutch and said reverse brake;

a first hydraulic circuit disposed downstream from said manually operated range shift means for supplying hydraulic pressure to said reverse brake so as to lock said reverse brake and discharging said hydraulic pressure from said reverse brake so as to unlock said reverse brake;

hydraulic pressure restraining means disposed in said first hydraulic circuit for restraining hydraulic pressure;

hydraulic pressure accumulation means disposed in said first hydraulic circuit downstream from said hydraulic pressure restraining means for accumulation of hydraulic pressure;

a switching valve disposed in said first hydraulic circuit downstream from said hydraulic pressure accumulation means for switching supply of said hydraulic pressure to said reverse clutch and discharge of said hydraulic pressure from said reverse clutch;

a second hydraulic circuit disposed downstream from said manually operated range shift means for supplying hydraulic pressure to said reverse clutch so as to lock said reverse clutch and discharging said hydraulic pressure from said reverse clutch so as to unlock said reverse clutch; and switching means disposed in said second hydraulic circuit for switching between hydraulic communication of said second hydraulic circuit with a section of said first hydraulic circuit, between said hydraulic pressure restraining means and said switching valve, and (2) hydraulic communication of said second hydraulic circuit with another section of said first hydraulic circuit upstream from said hydraulic pressure restraining means.

5. An automatic transmission control system as defined in claim 4, and further comprising a hydraulic pressure line provided in parallel with said switching means disposed in said second hydraulic circuit and a check valve disposed in said hydraulic pressure line for restraining hydraulic pressure discharged from said reverse clutch.

6. An automatic transmission control system as defined in claim 5, wherein said switching means switches hydraulic communication of said hydraulic pressure line, upstream from said check valve, with said first hydraulic circuit, between said hydraulic pressure restraining means and said switching valve, and hydraulic communication of said hydraulic pressure line upstream from said check valve with said hydraulic pressure line downstream from said check valve.

7. An automatic transmission control system as defined in claim 4, wherein said hydraulic pressure accumulation means includes regulation means for regulating back pressure supplied to said hydraulic pressure accumulation means so that said hydraulic pressure accumulation means provides shelf pressure in said hydraulic pressure for locking of said reverse brake during a shaft from said neutral range to said reverse range and shelf pressure in said hydraulic pressure for unlocking of said reverse clutch during a shift from said reverse range to said neutral range.

8. An automatic transmission control system for selectively locking and unlocking a plurality of frictional coupling elements including a reverse brake and a reverse clutch provided within an automatic transmission with hydraulic pressure so as to place the automatic transmission into any desired combination of gears, said reverse brake and said reverse clutch being locked to shift said automatic transmission to a reverse range, said automatic transmission control system comprising:

- a first hydraulic circuit for supplying hydraulic pressure to said reverse brake so as to lock said reverse brake and discharging said hydraulic pressure from said reverse brake so as to unlock said reverse brake;
- a first one-way orifice disposed in said first hydraulic circuit for restraining supply of hydraulic pressure to said reverse brake;
- a hydraulic pressure accumulator disposed in said first hydraulic circuit downstream from said first one-way orifice for accumulation of hydraulic pressure;
- a second hydraulic circuit for supplying hydraulic pressure to said reverse clutch so as to lock said reverse clutch and discharging said hydraulic pressure from said reverse clutch so as to unlock said reverse clutch;
- a second one-way orifice disposed in said second hydraulic circuit for restraining discharge of hydraulic pressure from said reverse clutch;
- a bypass hydraulic pressure line for allowing hydraulic pressure to bypass said first hydraulic circuit between said first one-way orifice and said hydraulic pressure accumulator and said second hydraulic circuit downstream from said second one-way orifice; and
- a bypass valve for connecting and disconnecting hydraulic communication of said bypass hydraulic pressure line.

9. An automatic transmission control system as defined in claim 8, wherein said bypass valve comprises one of a plurality of shift valves for causing said frictional coupling elements to be locked and unlocked so as to provide said desired combination of gears.

10. An automatic transmission control system as defined in claim 8, and further comprising a switching valve having a drain port disposed in said first hydraulic circuit downstream from said hydraulic pressure accumulator of discharge hydraulic pressure from said reverse brake, and control means for causing said bypass valve to provide said hydraulic communication of said bypass hydraulic pressure line upon a lapse of a predetermined time after a shift from said reverse range to a neutral range and for causing said switching valve to bring said first hydraulic circuit downstream from said switching valve into communication with said drain port.

11. An automatic transmission control system as defined in claim 10, wherein said predetermined time is from a shift made from said reverse range to said neutral range to when a predetermined rotational turbine is attained.

12. An automatic transmission control system as defined in claim 10, wherein at least one of said bypass valve and said switching valve is a shift valve used to perform a shift to one of said gears.

13. An automatic transmission control system as defined in claim 10, wherein said reverse brake has a disk plate.

14. An automatic transmission control system for selectively locking and unlocking a plurality of frictional coupling elements provided within and automatic transmission with hydraulic pressure so as to place the automatic transmission into any desired combination of gears, said automatic transmission control system comprising:

- range shift means for manually shifting said automatic transmission into a plurality of ranges including a reverse range, a neutral range and a forward range, said range shift means discharging hydraulic pressure from a specific one of said frictional coupling elements to unlock said specific one of said frictional coupling elements during a reverse related shift to said forward range from said reverse range; and
- pressure discharge rate regulating means for regulating a discharge rate of said hydraulic pressure so as to be larger for said reverse related shift than for a shift from one of said reverse range and said forward range to said neutral range.

15. An automatic transmission control system as defined in claim 14, wherein said pressure discharge rate regulating means comprises an orifice variable in opening size.

16. An automatic transmission control system as defined in claim 14, wherein said pressure discharge rate regulating means comprises a solenoid valve.

* * * * *